United States Patent [19]

Lawrence

[11] Patent Number: 5,758,070
[45] Date of Patent: May 26, 1998

[54] SYSTEM FOR DYNAMICALLY DETERMINING A NETWORK MEDIA TYPE OF A LAN USING FRAME TYPE IDENTIFYING VALUE FROM A CONFIGURATION TABLE

[75] Inventor: Thomas D. Lawrence, Mission Viejo, Calif.

[73] Assignee: Canon Kabushiki Kaisha, Tokyo, Japan

[21] Appl. No.: 540,138

[22] Filed: Oct. 6, 1995

[51] Int. Cl.$^6$ ............................................. G06F 13/00
[52] U.S. Cl. ........................... 395/200.5; 395/200.54; 395/200.8; 395/200.81; 395/200.82; 395/200.83; 395/836
[58] Field of Search .................... 395/183.15, 280, 395/500, 828, 250, 200.5, 200.54, 200.8, 200.81, 200.82, 200.83, 836; 370/94.1, 60, 389, 392

[56] References Cited

U.S. PATENT DOCUMENTS

| | | | |
|---|---|---|---|
| 5,301,303 | 4/1994 | Abraham et al. | 395/500 |
| 5,357,614 | 10/1994 | Pattisam et al. | 395/250 |
| 5,485,460 | 1/1996 | Schrier et al. | 370/94.1 |
| 5,497,460 | 3/1996 | Bailey et al. | 395/183.15 |
| 5,537,626 | 7/1996 | Kraslavsky et al. | 395/828 |
| 5,548,731 | 8/1996 | Chang et al. | 395/280 |
| 5,566,170 | 10/1996 | Bakke et al. | 370/60 |

OTHER PUBLICATIONS

"How do you spell Job Security? ODI and NDIS," John Montgomery, PC–Computing, vol. 7, No. 10, Oct. 1994, p. 218 (available in in DIALOG File 275: Computer Database, access No. 01699945.

"Remote access software links Windows and Macs," Tony Pampili, Windows Sources, vol. 1, No. 4, May 1993, p. 172 (available in DIALOG 275: Computer Database, access No. 01594574).

"Timbuktu Links Macs and PCs," Tom Henderson, Info-World, vol. 15, No. 11, Mar. 15, 1993, p. 76 (available on DIALOG File 275: Computer Database, access No. 01588510).

"NetWare network operating system, Apple Macintosh microcomputer," Paul Kent, et al., LAN Magazine, vol. 7, No. 12, Dec. 1992, p. 50 (available on DIALOG File 275: Computer Database, access No. 01546552.

"Netware," M. Keith Thompson, PC Magazine, vol. 11, No. 11, Jun. 16, 1992, p. 328 (available on DIALOG File 275: Computer Database, access No. 01517943).

(List continued on next page.)

*Primary Examiner*—Thomas C. Lee
*Assistant Examiner*—Le Thien Luu
*Attorney, Agent, or Firm*—Fitzpatrick, Cella, Harper & Scinto

[57] ABSTRACT

A method for dynamically determining a media type of a LAN to which a network device is connected, includes executing at least one network interface driver which supports a predefined network media type, and which has one or more configuration tables and one or more logical boards for processing communication packets having different frame types. Each configuration table is associated with one of the boards, which each includes a frame type identifying value that identifies a combination of frame type and media type for packets processed by the corresponding board. A multiplexer software module is executed, which interfaces between the network interface driver and one or more protocol stacks, and which routes packets from the network interface driver to respective protocol stacks. An executed protocol stack obtains an entry point of a network interface driver service routine via the multiplexer software module, obtains a location for one of the configuration tables via the service routine, reads the frame type identifying value in the one configuration table, and determines the network media type of the network interface driver by comparing the frame type identifying value read from the one configuration table to one or more values that correspond to a predetermined media type.

19 Claims, 20 Drawing Sheets

OTHER PUBLICATIONS

"Novell working on link for ODI, NDIS interfaces: software to to ease imcompatibles," Nico Krohn, PC Week, vol. 8, No. 49, Dec. 9, 1991, p. 8 (available on DIALOG File 275: Computer Database, access No. 01462010).

"The perfect partners? (Apple Computer Inc. and IBM)," unattributed col., PC User, No. 167, Sep. 11, 1991, p. 128 available on DIALOG File 275: Computer Database access No. 01451588).

Open Data–Link Interface Developer's Guide for DOS Workstation Protocol Stacks, Version 1.10, Novell, Inc., Mar. 18, 1992.

SYSTEM FOR DYNAMICALLY DETERMINING A NETWORK MEDIA TYPE OF A LAN USING FRAME TYPE IDENTIFYING VALUE FROM A CONFIGURATION TABLE

BACKGROUND OF THE INVENTION

1. Field Of The Invention

The present invention concerns a network interface device by which the functionality of a peripheral is made available to users of a computerized local or wide area network. More particularly, the present invention is a network interface device which communicates with other network devices over a network and which can dynamically determine the network media type.

2. Description Of The Related Art

Computerized local area networks (LAN's) are in widespread use for interconnecting many different computers and peripherals so as to allow users of the computers to communicate with one another and also to allow those users shared access to the peripherals. LAN's today are ordinarily organized into two different media types or architectures, Ethernet or token ring. Ethernet is a bus architecture in which each device can transmit messages to and receive messages from the LAN; token ring is a circular architecture in which a token is passed sequentially to each device and only the device with the token can transmit a message to the LAN. Because of fundamental differences in communications and in electrical connectivity, a token ring device cannot operate on an Ethernet medium, and vice versa. Accordingly, a network interface device will include media-type specific hardware components for interfacing with the LAN.

Recent developments in LAN's have seen the introduction of so-called "heterogeneous" LAN's, i.e., LAN's on which many different communication protocols are carried on a single Ethernet or token ring medium. Examples of different protocols are IPX/SPX, which is used by DOS-based PC's, TCP/IP, which is used by UNIX-based workstations, and AppleTalk, which is used by Macintosh computers.

In order for a peripheral to be shared on a heterogeneous LAN, the peripheral must have an appropriate protocol stack for each of the different protocols carried on the LAN. A protocol stack is a software module that processes packets of data which are received from or are transmitted to the LAN using the corresponding protocol. Each protocol has fixed rules that govern the exchange of information between two communicating devices, and the protocol stack ensures compliance with those rules. In a modular software implementation, the protocol stacks for the various protocols can be implemented independent of the hardware platform media type and can share a media-type specific module which interfaces with the LAN.

Complicating an already difficult situation, each of the different protocols can use any one of several different frame types. A frame type defines the format of a communication packet, i.e., the location and order in which information such as address data, protocol information, and data to be serviced by a peripheral server are presented in the packet. Thus, on an Ethernet medium, the protocols can use any of 802.2, 802.3, Ethernet_II, or Ethernet_SNAP frame types, whereas on a token ring medium, the protocols can use either a Token-Ring or Token-Ring_SNAP frame type. Thus, before a peripheral can provide shared access to itself from any one of different users on a heterogeneous LAN, the peripheral must know the protocols in use and the frame type used for each protocol.

In addition, the protocol stacks that provide network communication functions to software applications executing on the peripheral sometimes need to know whether the peripheral is connected to an Ethernet or a token ring medium. For example, the media type must be known to perform a so-called "multicast" transmission to all devices in a specific group. Multicasts allow efficient transmission to a group of devices without requiring every network device to process a broadcast transmission. Generally, when transmitting a packet a protocol stack must provide a destination address to the media-type specific module that interfaces with the LAN. For broadcasts and direct transmissions, the format of the destination address is the same on both Ethernet and token ring media, but multicasts require a different destination address format on different media types. Accordingly, a protocol stack must know the media type in order to provide a proper destination address to perform multicast transmissions.

There are various ways that information indicating the media type can be provided to a protocol stack software module. One way is to provide a configuration file from which a protocol stack module can read data indicating the media type. Another way is to have different versions of the protocol stack software for different media types, and to link the version appropriate to the media type in use. Each of these methods requires advance knowledge of the media type so that a human can selectively set appropriate data in a configuration file or can selectively link the appropriate software version. Therefore, using these methods of determining media type, a protocol implementation that supports multicasts must be preconfigured for use with a particular media type and cannot be designed generically for use with either media type.

A protocol stack that supports multicasts can be designed generically for use with either media type if the media type can be dynamically determined by the protocol stack. One method of doing this is for a protocol stack to read a variable set in global memory by a low-level network interface driver software module. However, this method cannot be used if the network interface driver and the protocol stacks are not designed to exchange data concerning the media type, for example, if the protocol stacks are provided by a different vendor than the network interface driver.

Accordingly, conventional methods do not allow a media type to be dynamically determined in such a manner that a protocol stack which supports multicasts can be written to work generically with different network interface drivers and different media types.

SUMMARY OF THE INVENTION

These needs are addressed by the present invention, in which a network media type is dynamically determined in such a manner that a protocol stack can be written generically to work with either an Ethernet or a token ring medium.

In one aspect, the present invention is a method for dynamically determining a media type of a LAN to which a network device is connected. A network interface driver software module is executed which is the lowest level of software to communicate with the LAN and which handles the sending and receiving of communication packets to and from the LAN by appending or stripping off packet frame headers. The network interface driver software module has one or more logical boards for processing communication packets having different respective frame types and has one or more configuration tables, each respectively associated with one of the logical boards, which each include a frame type identifying value that identifies a combination of frame type and media type for packets processed by the corresponding logical board. The network interface driver also has a service routine which is accessed by an entry point. One or more protocol stack modules are executed for processing packets that use different respective protocols, and a multiplexer software module is executed which interfaces between the network interface driver software module and the one or more protocol stack modules and which routes packets from the network interface driver software module to the respective protocol stack modules according to the protocol used by the packets. The entry point for the network interface driver service routine is obtained via the multiplexer software module, and a location of one of the configuration tables is obtained via the service routine. The frame type identifying value in the one configuration table is read, and the network media type is determined by comparing the frame type identifying value read from the one configuration table to one or more values that correspond to a predetermined media type.

By virtue of this arrangement, a protocol stack can be loaded and executed on any network device regardless of media type, without needing advance knowledge of the media type in order to preconfigure the protocol stack to operate with a particular media type. Moreover, the media type can be determined even if the network interface driver and the protocol stack are provided by different vendors.

According to another aspect, the present invention is a network interface device which interfaces with a LAN and which dynamically determines a media type of the LAN to which the network device is interfaced. The network interface device includes a storage device that stores (i) a network interface driver software module which is the lowest level of software to communicate with the LAN and which handles the sending and receiving of communication packets to and from the LAN by appending or stripping off packet frame headers, wherein the network interface driver software module has one or more logical boards for processing communication packets having different respective frame types, and wherein the network interface driver software module has a configuration table for each of the one or more logical boards and each configuration table includes a frame type identifying value that identifies a combination of frame type and media type for packets processed by the corresponding logical board, (ii) one or more protocol stack modules for processing packets that use different respective protocols, and (iii) a multiplexer software module which interfaces between the network interface driver software module and the one or more protocol stack modules and which routes packets from the network interface driver software module to the respective protocol stack modules according to the protocol used by the packets. The network interface device also includes a processor that (i) executes the network interface driver software module, the multiplexer software module, and the one or more protocol stack modules, (ii) reads the frame type identifying value in one of the configuration tables, and determines the network media type by comparing the frame type identifying value read from the one configuration table to one or more values that correspond to a predetermined media type.

By virtue of this arrangement, a network interface device can be connected to either an Ethernet or a token ring medium without reconfiguring or exchanging the protocol stack software.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENT

[1. System Description]

Generally, the present invention is applicable to any device which communicates with other devices via a network. Preferably, the invention is used in an embedded device such as a network interface board (NIB) for connecting a copier to a network. The invention can also be used in a network-expansion board (NEB) or a network expansion device (NED) for connecting a printer or other peripheral, such as a scanner, to a network. The present invention also has utility for computers connected to a network.

Figure 1:
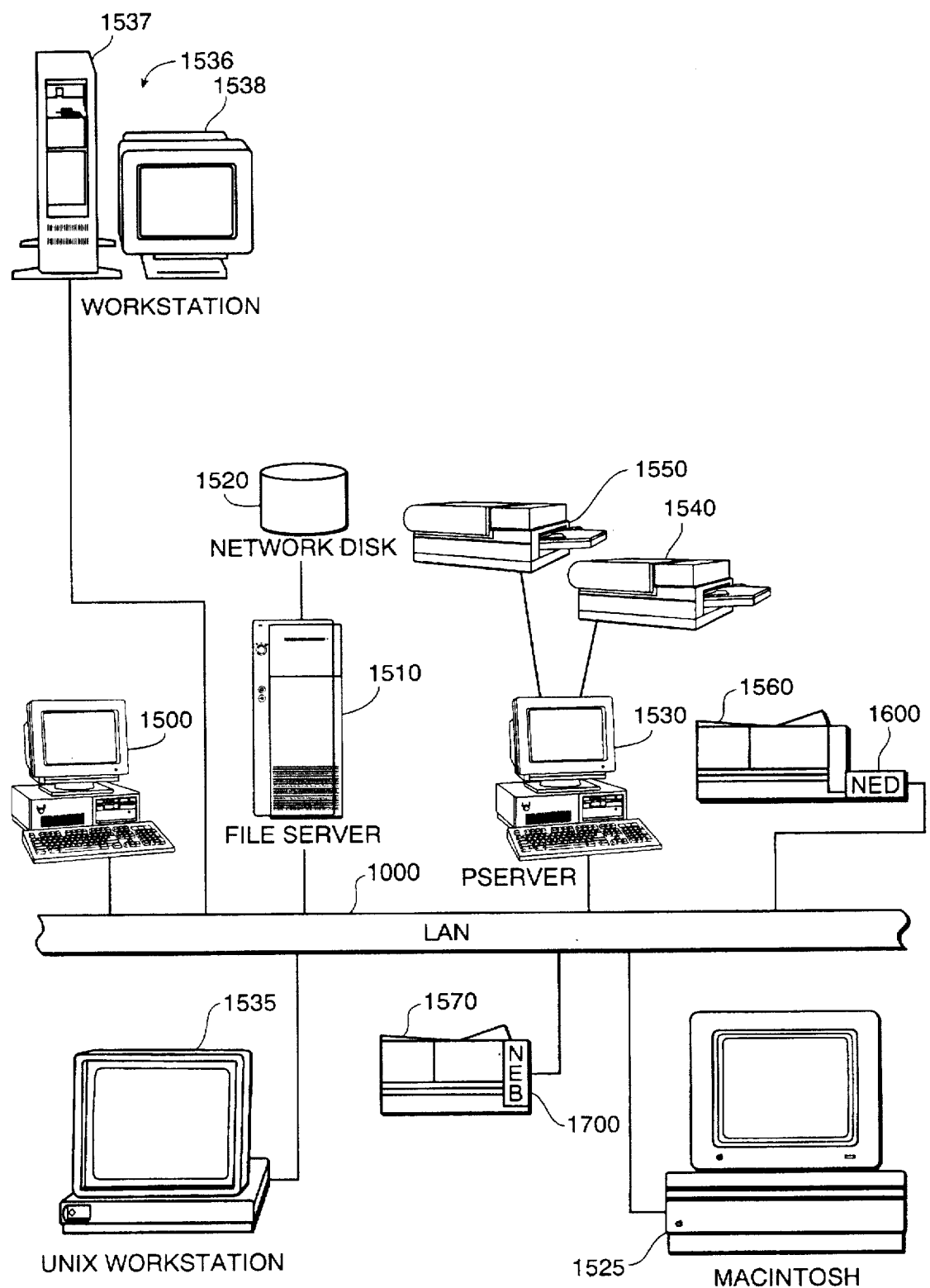
FIG. 1 is an overall system view of a local area network using an Ethernet medium.

FIG. 1 is an overall system view of a network. The network includes LAN 1000, a plurality of computers, and a plurality of peripherals to which the computers share access. The computers shown in FIG. 1 include a PC 1500 which serves as a system administrator's computer, a PC 1530 which serves as a print server for printers 1550 and 1540, a Macintosh-type computer 1525, a Unix-type workstation 1535, and a generalized workstation 1536 which has a central processing unit 1537 and a display 1538. A file server 1510 allows shared access to a network disk 1520. Also, NED 1600 allows shared access to a printer 1560 and NEB 1700 allows shared access-to a printer 1570. As depicted in FIG. 1, LAN 1000 is an Ethernet medium having a bus-type architecture.

Figure 2:
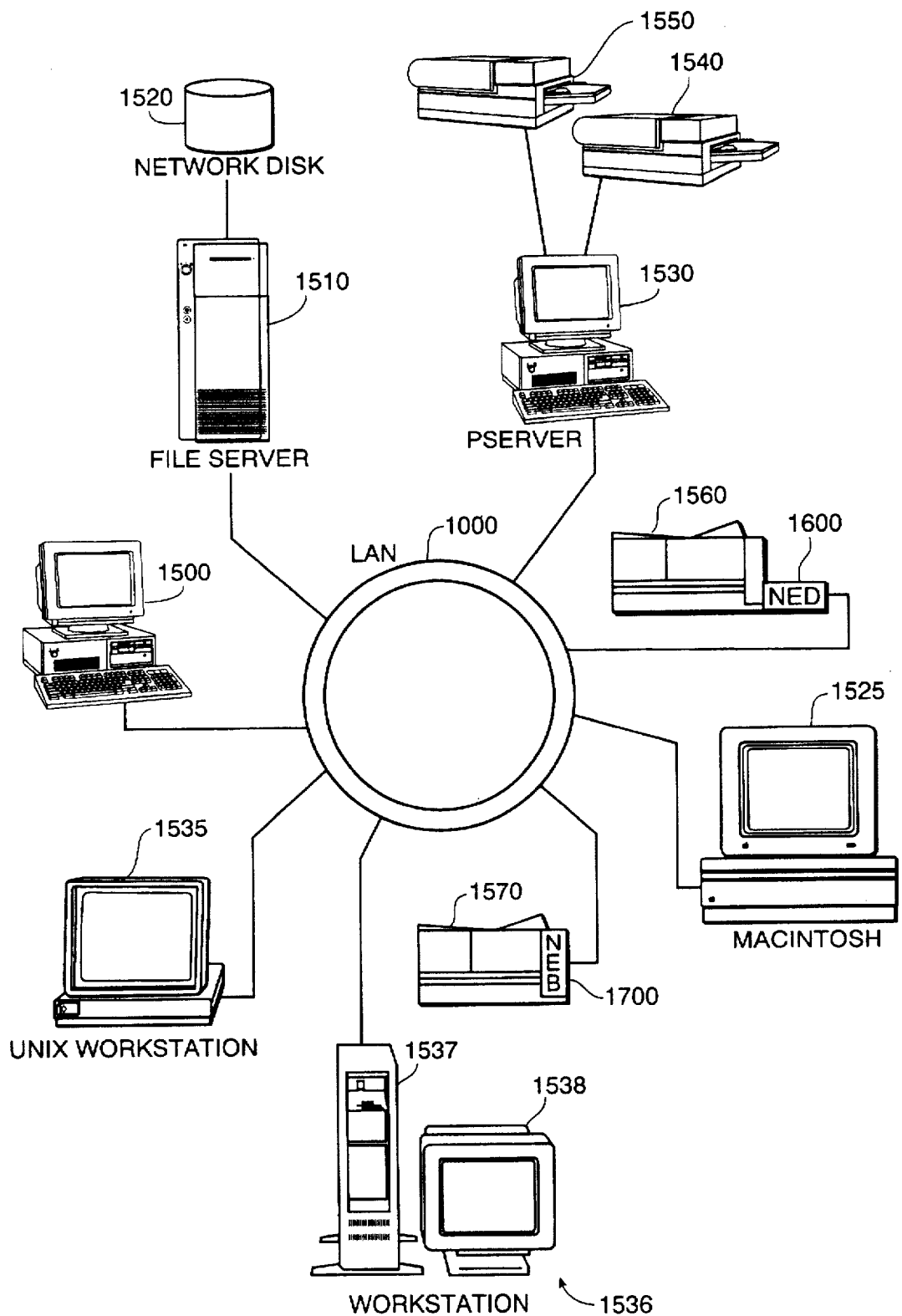
FIG. 2 is an overall system view of a local area network using a token ring medium.

Alternatively, as shown in FIG. 2, LAN 1000 can be a token ring medium having a ring-shaped architecture. A token ring medium uses a different type of physical wire, different electrical connections, and different communication techniques than an Ethernet medium. Therefore, operation of a device on a token ring medium is mutually exclusive of operation on an Ethernet medium.

Figure 3:
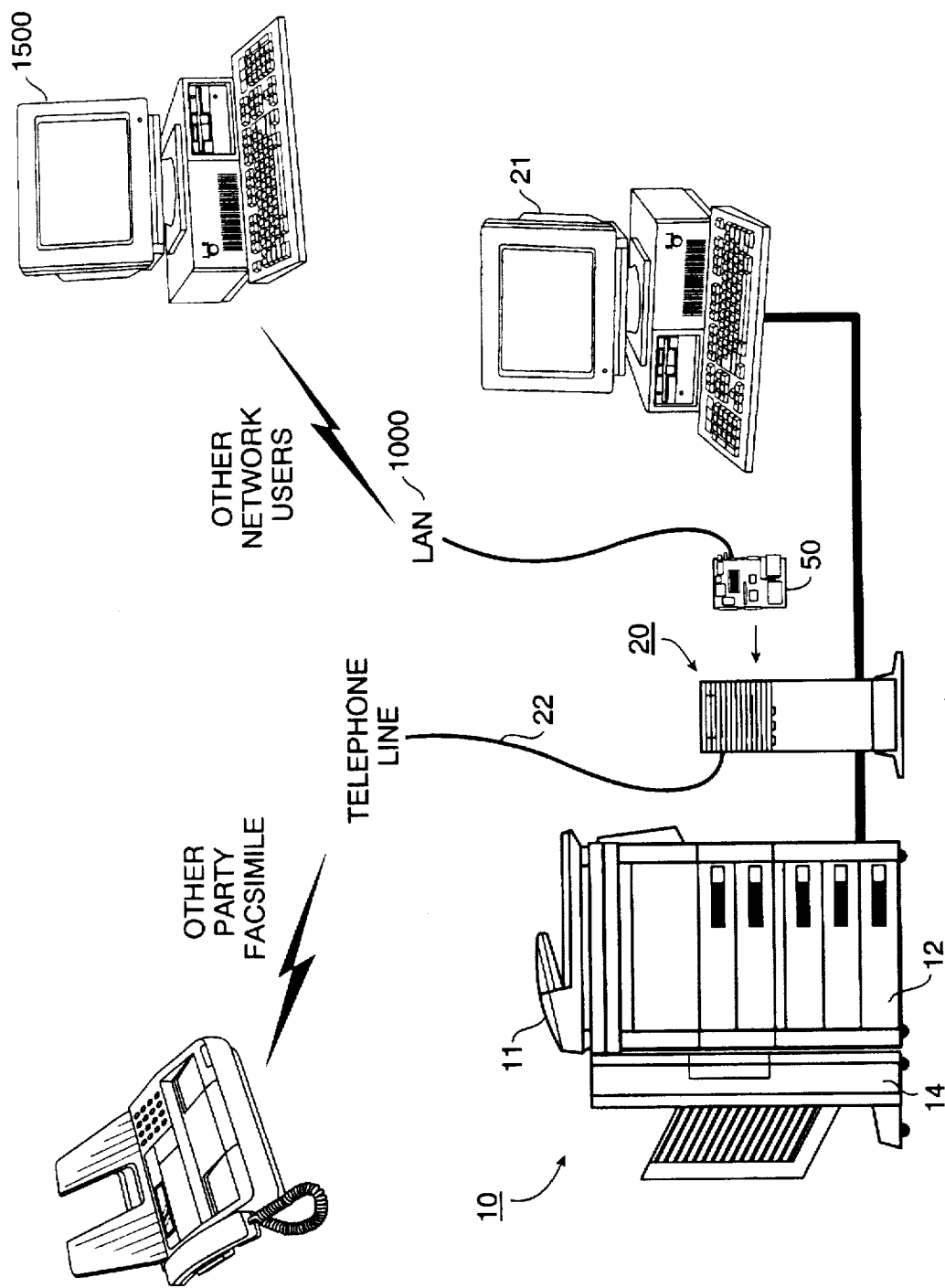
FIG. 3 is a view of a cut-away section of a local area network which shows a network interface board installed in a multi-device controller (MDC) which includes a core board for controlling a digital copier.

FIG. 3 illustrates a cut-away section of LAN 1000 which includes a network interface board (hereinafter "NIB") 50 installed in a multi-device controller 20 which also controls a digital copier 10. LAN 1000 as depicted in FIG. 3 can be either an Ethernet or a token ring medium.

As seen in FIG. 3, a digital copier 10 includes a document feed section 11, a paper supply storage section 12, and a sorter/stacker 14. A suitable digital copier for use in the present invention is a Canon GP55F digital copier. As is known, such digital copiers operate to feed documents in document feed section 11 past a digital scanner so as to obtain a digital image of the scanned-in document. An unshown internal printer prints the scanned-in digital image onto paper supplied from paper supply storage section 12 and ejects the printed image to sorter/stacker 14.

A multi-device controller (hereinafter "MDC") 20 accesses an interface bus (not shown) of digital dopier 10 so as to break out the functionality of the scanner section and the printer section. MDC 20 includes a core board 24 (not shown) which accesses the interface bus of digital copier 10 and which provides access to that interface bus for plural option boards which are connectable to the core board. The option boards communicate with the core board via master/slave communication through dual port RAM on each option board. Most typically, one of the option boards will include an interface board so as to permit connection to MDC 20 by a stand-alone computer such as computer 21. Option boards may also include a facsimile board so as to permit connection to a facsimile device via a telephone line 22, rasterizer boards so as to permit rasterization of page description language commands such as PCL5, LIPS, Postscript, and the like, and image processor boards which perform advanced image processing functions.

Most notably, according to the present invention one of the option boards is a network interface board (NIB) 50 connectable to the core board in MDC 20 so as to permit access to a local area network such as LAN 1000.

In operation, digital copier 10 is operable in a stand-alone mode as a standard digital copier. In addition, it is operable as a scanner or as a printer to local users via personal computer 21. Most typically, via NIB 50, and in coordination with MDC 20, digital copier 10 is operable as a multi-functional network device accessible via a LAN 1000 by any of multiple network users who may desire concurrent use of the scanner in copier 10, the printer in copier 10, or one of the option boards in MDC 20 such as the aforementioned facsimile option board, rasterizer option board, or image processing option board.

[2. Network Interface Board]

Figure 4:
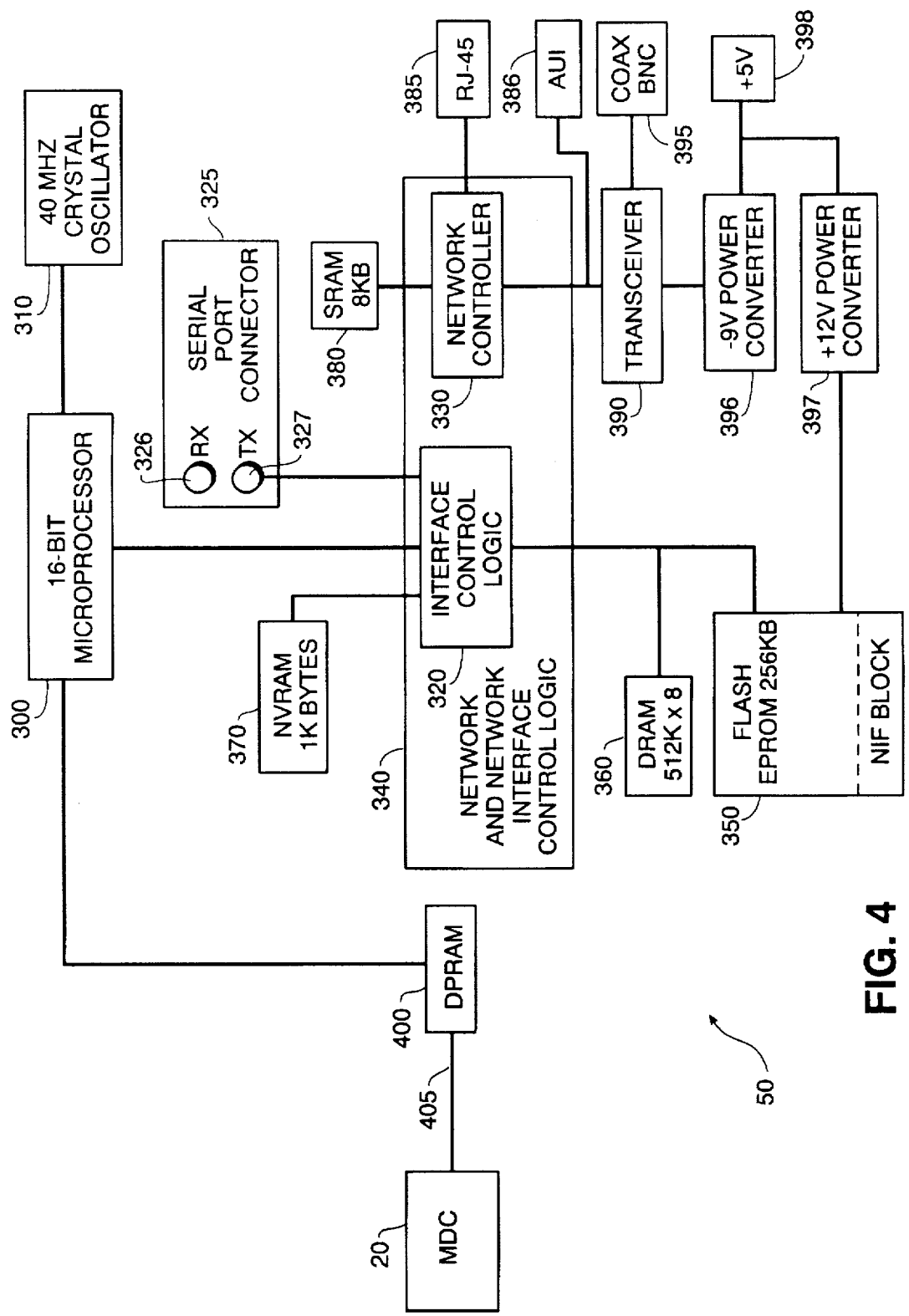
FIG. 4 is a block diagram of the network interface board.

FIG. 4 is a functional block diagram of NIB 50. Broadly speaking, NIB 50 is an interactive network circuit board which couples copier 10 to LAN 1000, making copier 10 a responsive and interactive network member. In this way, the printing and scanning functions of copier 10 can be utilized by users at other network devices. NIB 50 receives print data, status requests, and control commands from LAN 1000, transmits print data, status requests, and control commands to copier 10 for execution, and transmits status information back to LAN 100. Thus, NIB 50 can perform not only LAN "print services", e.g., RPRINTER remote printer services and PSERVER print server functionalities, but can also offer to network members whatever status and control features are available from the peripheral interface.

Power for all circuits is supplied to NIB 50 from a +5V power source 398. Power is provided from power source 398 to power converter 396 which provides −9V power to a transceiver 390 and to power converter 397 which provides +12V power to a flash EPROM 350 for "flashing" (i.e., reprogramming of the EPROM). Network and network interface control logic 340 is preferably a single 144-pin application specific integrated circuit (ASIC) that includes a network controller 330 and interface control logic 320. Network controller 330 is an NCR macro-cell compatible with a National DP83902A "ST-NIC" Ethernet controller, the details of which can be found in National Semiconductor's *Local Area Networks Databook*, National Semiconductor p/n 400055, National Semiconductor, 1993. Network controller 330 is designed to interface with CSMA/CD-type (carrier sense multiple access with collision detection) local area networks.

Network controller 330 connects with RJ-45 connector 385 directly and with coaxial connector 395 through transceiver 390, which is preferably a National Semiconductor DP8392C coaxial transceiver interface, the details of which can also be found in National's *Local Area Networks Databook*. Network controller 330 also connects with AUI (Attachment Unit Interface) connector 386. AUI connector 386 is the most shielded, i.e., has the greatest noise immunity, of the three connectors. Network controller 330 is also coupled to an 8 KB SRAM 380 that is used as an input/output packet buffer for Ethernet data. This memory should preferably have an access time of about 70 ns or less.

Interface control logic 320 provides an interface between network controller 330, microprocessor 300, and memory devices EPROM 350 and DRAM 360. Interface control logic 320 also interfaces with non-volatile random access memory (NVRAM) 370, which preferably is a 1 KB (1024 byte) serial electrically erasable/programmable memory used for initialization data storage during power cycling of copier 10. Network and peripheral configuration parameters are written into NVRAM 370 when copier 10 is first installed onto the network to allow NIB software to recover the installation parameters after MDC power has been cycled off and on.

Interface control logic 320 also couples with serial port connector 325, which comprises a receive data pin 326 and a transmit data pin 327 that can respectively receive and transmit serial data streams for debugging purposes. Interface control logic 320 senses data present at the receive data line and samples the serial bits at regular intervals.

The central controller of NIB 50 is microprocessor 300, which is preferably an NEC uPD70236 (V53) 16-bit processor, the details of which can be found in the NEC V53 User's Manual, NEC, Inc. This processor is an 16-bit processor with direct memory access (DMA), interrupts, timers, and a DRAM refresh control. Other microprocessors, such as an AMD 80C188-20 16-bit microprocessor, might alternatively be used. 256 KB flash EPROM 350 and 512 KB DRAM 360 are coupled to microprocessor 300 via interface control logic 320. A 40 MHz, 50 ppm crystal oscillator 310 provides microprocessor 300 with a clock signal that is wholly separate from and asynchronous with the clock signal of MDC 20 or that of copier 10. All communication between NIB 50 and MDC 20 occurs over a special bus 405 via an 8 KB dual port RAM (DPRAM) 400. Special bus 405 has a 96 pin connector and carries sixteen data bits, sixteen address bits, a chip select signal, memory read and write signals, buffer enable and read signals, a clock input signal, and the like.

Microprocessor 300 executes instructions stored in flash EPROM 350, which stores control firmware and printing application software. After power-on self-test (POST), code from EPROM 350 is selectively moved to the higher performance 512 KB DRAM 360, which should preferably have an access time of about 80 ns, for actual execution.

All software modules executed by microprocessor 300 are stored in flash EPROM 350. Those modules that are needed are selectively loaded from EPROM 350 into DRAM 360 and are executed from DRAM. This permits flexible configuration of NIB 50 by selection of which modules are to be loaded. Alternatively, software modules can be downloaded via the LAN or a serial port.

A configuration file 75 is stored in, for example, NVRAM 370 which is processed by microprocessor 300 upon power on or receipt of a boot-up command. The configuration file ordinarily directs processor 300 as to how to partition memory, what memory-resident programs are to be loaded from EPROM 350 into which areas of memory, what application programs are to be started as concurrently executed tasks, and the like. For example, configuration file 75 may include instructions to microprocessor 300 to dedicate certain areas of DRAM 360 for network communication protocol. Further, the modules to be loaded may be indicated by using a bit mask which has a bit corresponding to each module stored in EPROM 350. A "loader" module stored in EPROM 350 which executes after the above-mentioned POST routine checks the state of each bit in the mask and, if the bit is "1", loads the corresponding module from EPROM 350.

Figure 5:
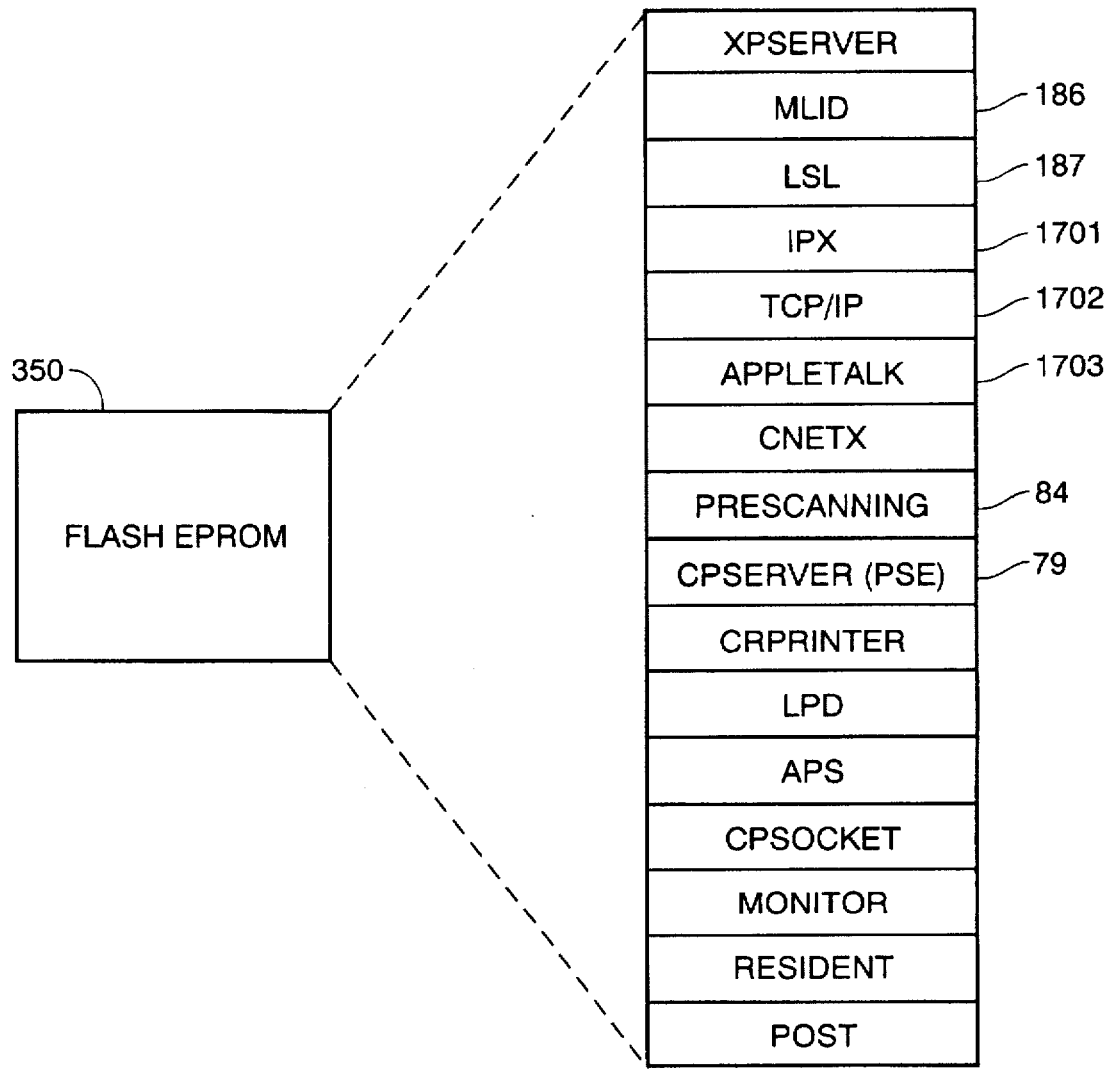
FIG. 5 is a view illustrating program modules stored persistent storage on the network interface board.

FIG. 5 illustrates an example of software modules (or programs), that are stored in flash EPROM 350. XPS-ERVER is a module that provides a standardized interface between NIB 50 and MDC 20. MLID (Multi-Link Interface Driver) 186 serves as a network interface driver, while LSL (Link Support Layer) 187 serves as a multiplexer software module which multiplexes between MLID and the protocol stack modules. An IPX protocol stack module 1701 for supporting IPX/SPX protocol used by NetWare (Novell's network software) is also contained in EPROM 350. Since NIB 50 can support multiple protocols, it can include protocol stacks for other modules, such as a TCP/IP protocol stack module 1702 and an AppleTalk protocol stack module 1703, for example. Other protocols such as NetBIOS/NETBEUI also may be supported.

In the preferred form of the invention, the network interface driver, multiplexer, and protocol stack modules conform to the Open Data-Link Interface (ODI) specification described in "Open Data-Link Interface Developer's Guide for DOS Workstation Protocol Stacks", Version 1.10, Released by Novell, Inc., Mar. 18, 1992. Particularly, MLID 186 is the lowest level of network connection software and handles sending and receiving of packets to and from the network by adding or stripping off frame headers. MLID 186 includes a separate board for processing each frame type that may be used on the network. The boards may be logical boards or physical boards, but logical boards are used in the preferred embodiment. In an Ethernet device, there are four logical boards, with logical boards 0 through 3 respectively processing frame types 802.3, 802.2, Ethernet_II, and Ethernet_SNAP. A token ring device has only two logical boards for respectively processing Token-Ring and Token-Ring_SNAP frame types.

For each logical board, MLID 186 has a configuration table that stores configuration information for the logical board, such as the information indicated in the MLID configuration table format of the above-referenced ODI specification. For example, this information includes the configuration table version, node address, board number, maximum packet size, best data size, worst data size, frame type ID, transport time, source route handler, line speed, queue depth, number of send retries, default base memory address, memory size, etc.

The frame type ID is a value identifying the frame type processed by the logical board corresponding to the configuration table. In an Ethernet device, the frame type ID values shown in Table 1 are used, and in a token ring device, the frame type ID values shown in Table 2 are used:

TABLE 1

| Frame Type | ID Value |
|---|---|
| Ethernet_II | 2 |
| 802.2 | 3 |
| 802.3 | 5 |
| Ethernet_SNAP | 10 |

TABLE 2

| Frame Type | ID Value |
|---|---|
| Token-Ring | 4 |
| Token-Ring_SNAP | 11 |

LSL 187 (link support layer) comprises software code that acts as a multiplexer between the lowest level MLID 186 functionality and network protocol stacks above. Since several different protocols can be used on LAN 1000, and some may even use the same frame type, some provision is needed to route packets from MLID 186 to the correct protocol stack. LSL 187 performs that function. In particular, LSL 187 assigns a Protocol ID (PID) to each loaded protocol stack. The PID is included in a packet and is used by LSL 187 in conjunction with the frame type to route a received packet to a protocol stack. In particular, LSL 187 accepts registrations of any of the various frame types with which frame packets may be carried on the network. Thus, for example, in an Ethernet environment, LSL 187 will accept registrations of 802.2, 802.3, Ethernet_II, and Ethernet_SNAP, and in a token ring environment LSL 187 will accept registrations for Token-Ring and Token-Ring_SNAP. By registering a frame type with LSL 187, a software module above LSL 187 instructs LSL 187 to provide the module with all frame packets that match the registered frame type. Other multiplexer software modules that perform the same function may be used.

The protocol stacks 1701-1703 perform the function of receiving packets for the respective protocols, determining what needs to be done with the packets, and sending the packets to the necessary destination, e.g., a print server module or a scan server module.

CNETX is customized code that turns local DOS-like function calls into network function calls, providing file functions like OPEN, READ, WRITE, and CLOSE.

CNETX also provides NCP (NetWare Core Protocol) for NetWare server modules. The pre-scanning program 84 is responsible for identifying what frame types are associated with the various possible protocol stacks. Because NIB 50 supports multiple protocol stacks, this module exists as long as NIB 50 is running.

Pre-scanning program 84 performs a so-called "autosensing" (AS) function to identify what frame types (such as 802.2, 802.3, Ethernet_II or Ethernet_SNAP for an Ethernet medium) are associated with what protocol stack (for example, IPX/SPX or TCP/IP). The operation of pre-scanning program 84 is described in detail below. Pre-scanning program 84 includes a portion which performs a so-called "configurator" function, which is also described in detail below. The configurator function allows reconfiguration of loaded protocol stacks and frame type assignments from a remote computer.

EPROM 350 also includes software to export the functionality of copier 10 onto the LAN. CPSERVER (PSE) 79 is a custom implementation (or emulation) of a Novell NetWare printer server application. This module provides self-generated print banners, user notification of completion and exception status, and transmission of print data and status commands to copier 10 when serving as a printer. This differs from the Novell print server in that CPSERVER is dedicated to driving the local printer (i.e., copier 10 to which NIB 50 is coupled) and cannot drive any remote RPRINTERs. This program owns the print data lines for the duration of a print job. CRPRINTER is a custom implementation of a Novell RPRINTER print application. This module is a slave application that is sent data by a Novell printer server application elsewhere on LAN 10. EPROM 350 also includes an LPD (Line Printer Daemon) module, which is a print application for UNIX, and an APS (Apple Print Server) module, which is a print application for Macintosh.

EPROM 350 can also include other servers, such as an FSC task which handles fax status and control tasks, an FSR task which handles fax send and receive tasks for a facsimile board present in MDC 20, a scan server, and an image processing server. Those other servers operate to export functionality of other option boards connected to MDC 20.

The CPSOCKET program runs for all protocol stacks. The program responds to requests for remote utilities connection, requests for data download, or requests for services from remote utilities, and provides status and control to other tasks via interprocess communication. Because CPSOCKET typically owns the status and control lines between NIB 50 and MDC 20, it is the only task that has the ability to obtain status data from copier 10 via the status lines. CPSOCKET is responsible for the network connection and packet contents between, for example, the Novell-oriented status and control utilities, between the UNIX-oriented status and control utilities, or between Macintosh-oriented status and control utilities.

MONITOR is a customized multi-tasking kernel which performs task creation, task destruction and microprocessor dispatch. MONITOR also has memory management sub-modules MEMGET and MEMFREE. RESIDENT is a block of routines that provides generic services such as read and write to flash EPROM 350, FLASH code, ROM based debugger, hardware timer tick and other basic features. POST is the power-on self-test module that checks the integrity of NIB hardware and software at power-up.

A network identification file (NIF) data block is also provided which stores board-invariant information, which is unique for every network board (e.g., a MAC (media access control) address), hardware configuration data, board revision number and the like, as well as changeable information such as software version number. On the NIB, the NIF is stored in a separate ROM. On other interface boards, such as NEBs and NEDs, the NIF may be stored in EPROM 350. The information in the NIF data block is used, among other things, to ensure that flash EPROM 350 is not reprogrammed with an incompatible firmware image.

Specifically, EPROM 350 stores "board" information such as model number, firmware level, and board revision number, as well as "network" information such as Media Access Control (MAC) address, which is unique for every network board, board name, primary file server identification, queues serviced, sampling frequency, PSERVER name, zone-name, and the like.

[3. Operation]

Operation of the network interface board will now be explained with reference to the flow diagram shown in FIG. 6. The process steps shown in FIG. 6 are executed by microprocessor 300 by loading the software modules shown in FIG. 5 into DRAM 360 and executing the process steps from DRAM.

In step S601, upon application of power or suitable logic reset, CPU 52 initiates boot-up processing by reference to configuration file 75. The configuration file, as mentioned above, can include various options fixing the configuration of NIB 50, such as memory allocation, operating system, etc. Ordinarily, configuration file 75 configures NIB 50 as a network interface board interfacing between the network and MDC 20. In that instance, configuration file 75, as mentioned above, includes configuration of memory, allocation of memory space for various memory-resident programs such as a network communication stack, and initiation and loading of various program modules.

Figure 6:
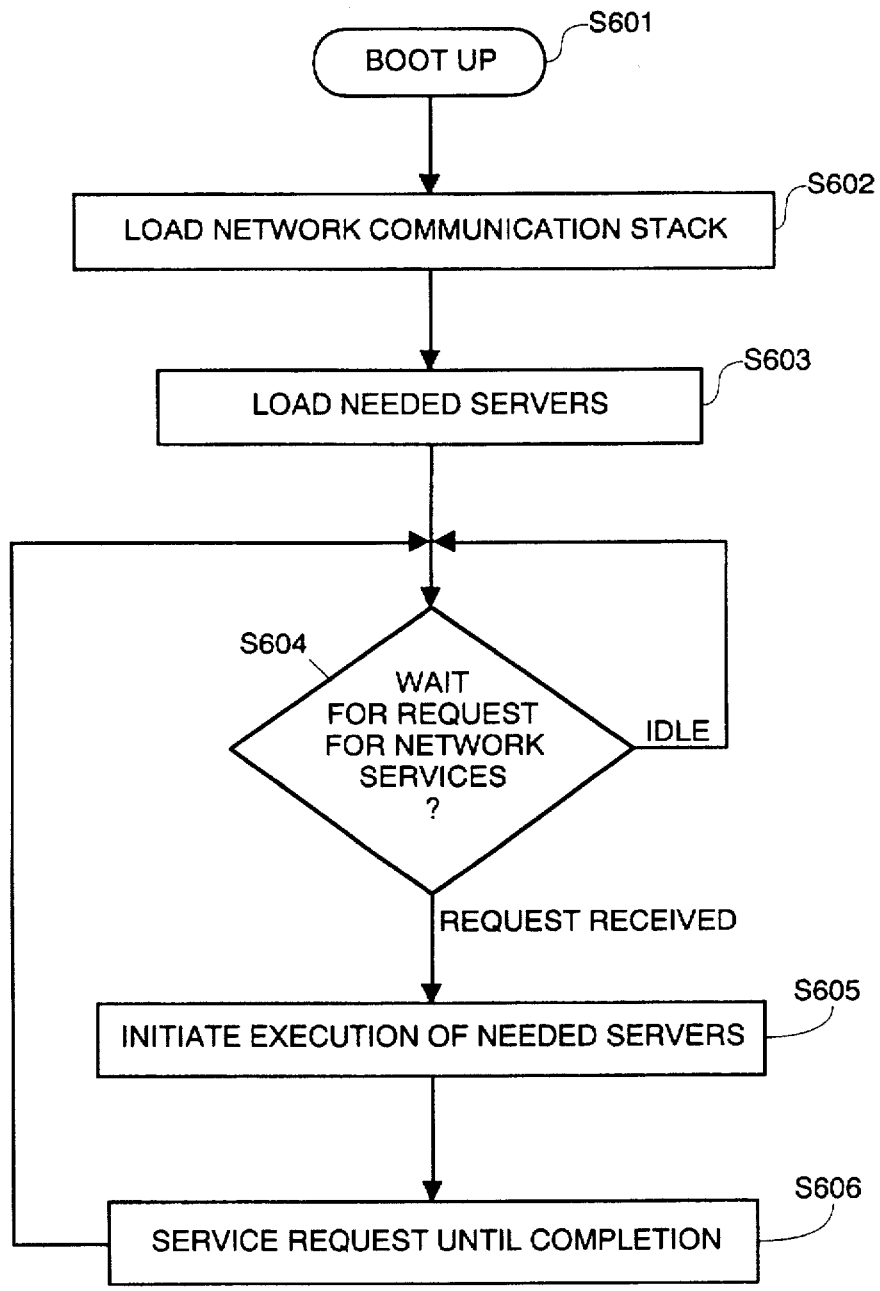
FIG. 6 is a flow diagram for explaining the general operation of the network interface board.

As shown in FIG. 6, in step S602, microprocessor 300 loads its network communication software. Specifically, microprocessor 300 loads MLID 186 and LSL 187 into memory allocated for them (typically high memory), and in addition loads whatever network communication stacks are needed for participating in network communications in the network environment that NIB 50 is installed in, as indicated by default configuration information in configuration file 75. For example, in a situation where a Novell NetWare network environment has been established, microprocessor 300 would load an IPX/SPX network communication stack into memory. Likewise, in a situation where a UNIX network operating system is in place, microprocessor 300 would load a TCP/IP network communication stack into memory. Whether to load IPX/SPX, TCP/IP, AppleTalk, or any combination, is stored as part of the default start-up script in configuration file 75.

As mentioned above, pre-scanning program 84 can detect what frame type is being used on the network for each protocol. However, default data in configuration file 75 can alternatively be used to assign a frame type to each loaded protocol stack. In the preferred form of the invention, configuration file 75 contains data for a default configuration in which a TCP/IP protocol stack is loaded and assigned an Ethernet_II frame type, an AppleTalk protocol stack is loaded and assigned a Phase 2 (Ethernet_SNAP) frame type, and an IPX/SPX protocol stack is loaded and assigned a frame type by autosensing using pre-scanning program 84.

In step S603 the needed network servers (such as CPSERVER 79 and the like) are all loaded. Then, in step S604, NIB 50 waits for a request for network services. Until a request for network services is received, NIB 50 stands by in an idle state, responding to access inquiry commands from core board 24 with simple acknowledgement ("ACK").

On the other hand, as soon as a request for network services is received, either from the network or from a local user such as a user operating digital copier 10, flow advances to step S605.

In steps S605 and S606, after a request for network services has been received, the request is serviced. In particular, in step S605, microprocessor 300 initiates execution of the appropriate network server. For example, in a situation where a request for print services is requested, microprocessor 300 initiates execution of CPSERVER 79.

In step S606, microprocessor 300 continues execution of the needed server so as to service the request. Then, flow returns to step S604 to wait for additional requests for network services. Meanwhile, services already being processed in step S606 continue until they are complete. Should additional requests be received, then microprocessor 300 initiates execution of the appropriate server (step S605) and begins servicing the request (step S606). Concurrent network processing, to the extent physically supported by devices controlled by NIB 50, is then carried out.

[3.1 Autosensing Frame Types and Configurator Function]

As mentioned above, the present invention includes a configurator function that allows the protocol stacks which are loaded in a peripheral and the frame type assignments for each loaded protocol stack to be reconfigured from a computer at a remote location. In the preferred embodiment, the configurator function is encoded as part of pre-scanning program 84 and relies in part upon the operational relationship between pre-scanning program 84 and LSL 187 to receive packets from the remote computer which contain new configuration information.

Figure 7A:
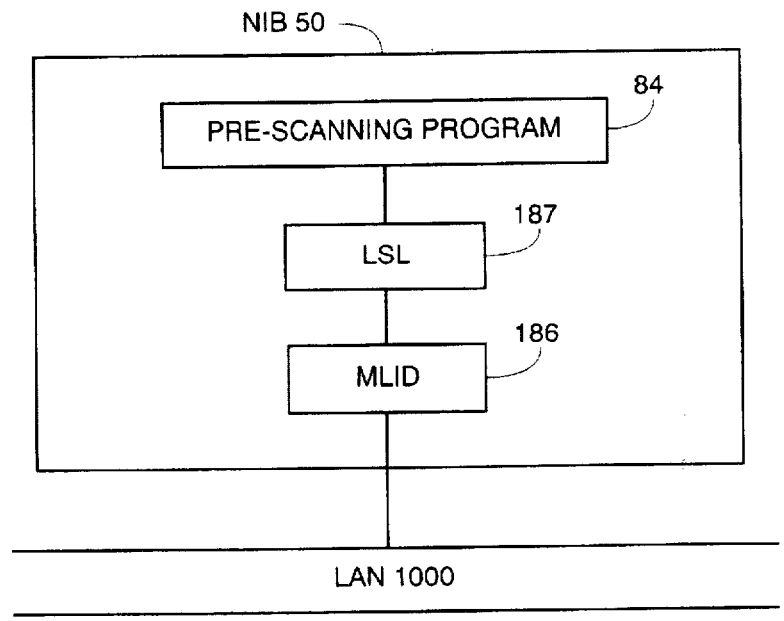
FIGS. 7A and 7B are diagrams showing the network communication software architecture on the network during frame type scanning and after protocol stacks are loaded.
Figure 7B:
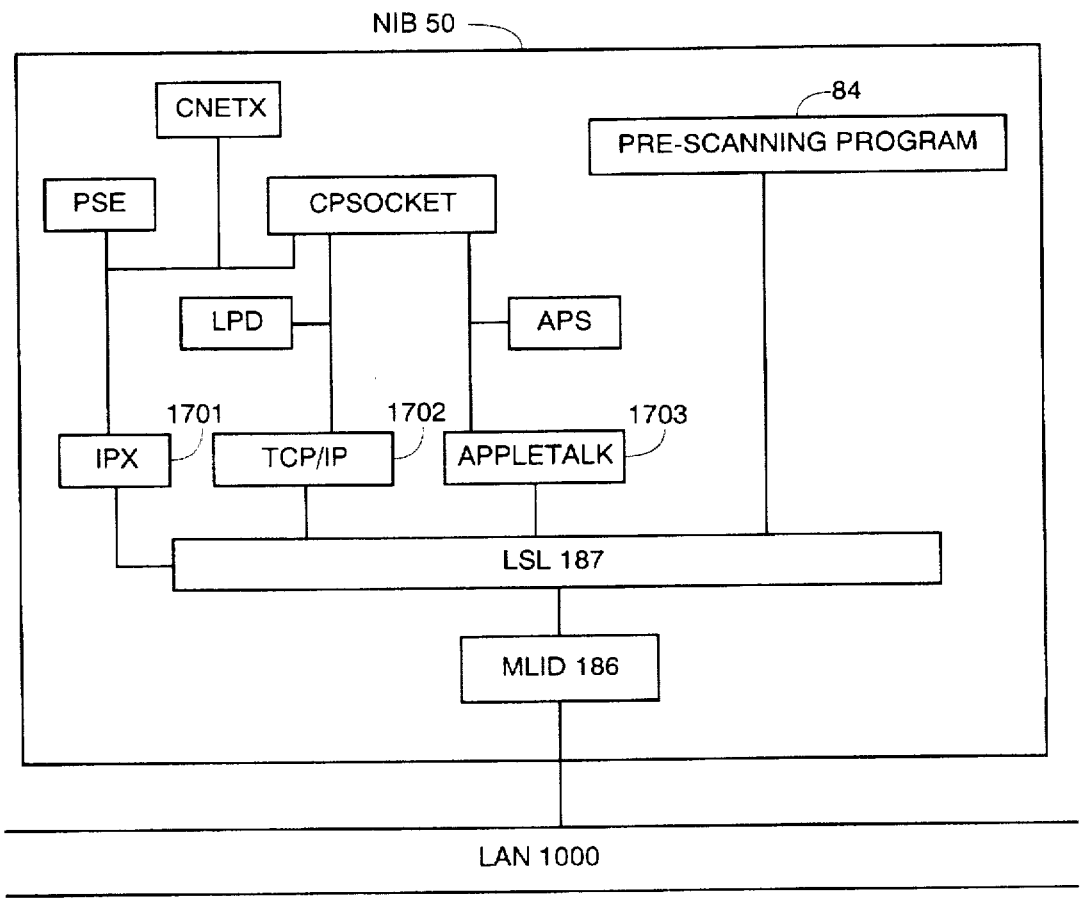

FIG. 7A shows the software architecture in NIB 50 during initialization, while pre-scanning program 84 is determining frame types and before any of protocol stacks 1701–1703 are loaded. In that situation, MLID 186 interfaces with LAN 1000, LSL 187 is on top of MLID 186, and pre-scanning program 84 is on top of LSL 187. FIG. 7B shows the software architecture after protocol stacks have been loaded. In this case, protocol stacks 1701–1703 are loaded on top of LSL 187, but pre-scanning program 84 remains resident for reasons described below and is also on top of LSL 187. CPSOCKET is loaded on top of all protocol stacks to receive network requests for services or status. Print (or other service) application modules also load on top of the protocol stacks.

As mentioned above, pre-scanning program 84 performs a function of monitoring network broadcast traffic in detecting what frame type is used for a particular protocol or protocols, and assigning the detected frame type to the associated protocol. As such, pre-scanning program 84 receives all packets that are not wanted by any protocols that have registered with LSL 187 for each frame type. The reception of packets in this manner is important to the autosensing function, which is described next, and is also important to the configurator function described below. It should be noted that autosensing of frame type/protocol assignment is a configurable option, because the frame type/protocol assignments can be pre-assigned, for example, using a configuration file. The configurator function, on the other hand, is always active.

Figure 8:
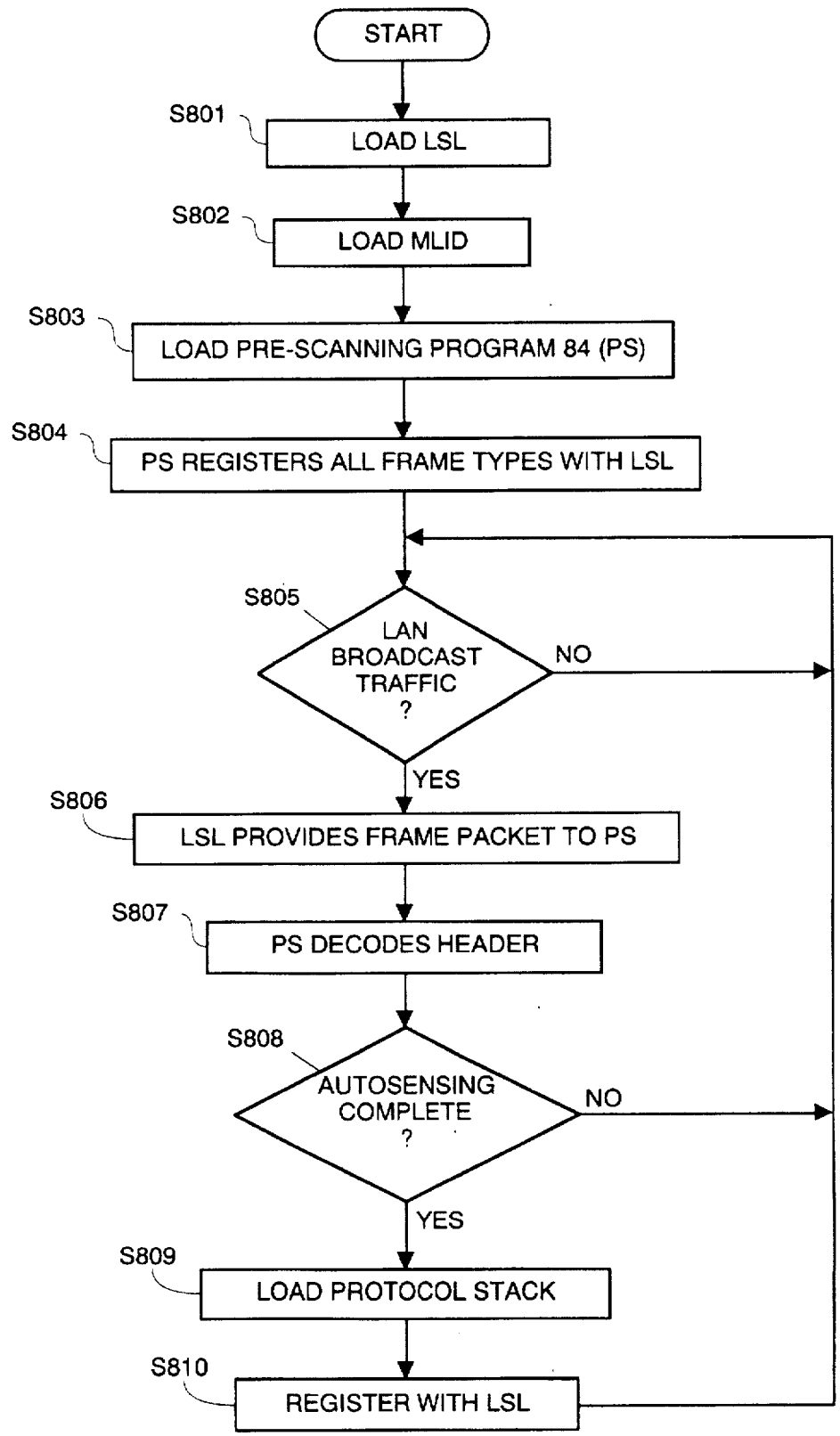
FIG. 8 is a flow diagram showing a process for autosensing of a frame type used for a protocol.

FIGS. 8 and 9(a) through 9(d) illustrate one implementation for performing autosensing. FIG. 8 is a flow diagram showing process steps which are executed by NIB microprocessor 300 in accordance with an exemplary embodiment of pre-scanning program 84 loaded from EPROM 350. Specifically, the process steps of FIG. 8 illustrate a method for loading a network communication stack in accordance with step S602 of FIG. 6.

FIGS. 9(a) through 9(d) show the functional relationships between different software modules during autosensing. In particular, those figures show an example of autosensing in which pre-scanning program 84 assigns frame type 802.2 to IPX. The actual structure that implements the process of FIG. 8 and creates the functional relationships can be understood with reference to FIG. 4. Software modules stored EPROM 350 are loaded into DRAM 360 under the control of microprocessor 300. The needed software modules are then executed by the microprocessor 300. Assuming an Ethernet medium, packets are received over a physical wire at RJ45 connector 385 and are routed to network controller 330. Packets that are intended for NIB 50 are then stored in DRAM 360 under the control of microprocessor 300, and packets are routed between software modules by passing the memory address where the packet is stored.

Referring now to FIG. 8, in step S801, microprocessor 300 loads LSL 187 (link support layer) and begins executing LSL 187. As discussed above, LSL 187 acts as a multiplexer between the low level MLID 186 (multi-link interface driver) and various protocol stacks which may be loaded above it.

In step S802, microprocessor 300 loads MLID 186. As described above, MLID 186 is the lowest level of software that communicates to the network. MLID 186 thus acts as the direct software interface to the network frame packets which are carried on the network wire. Other network interface drivers that perform the same function may be used.

In step S803, microprocessor 300 loads pre-scanning program 84 on top of LSL 187. As mentioned above, pre-scanning program 84 is responsible for identifying, if so configured, what frame types are associated with the various protocols in which NIB 50 is adapted to communicate. In step S804, pre-scanning program 84 registers to receive from LSL 187 all frame types that are supported by MLID 186, thereby instructing LSL 187 to provide pre-scanning program 84 with all frame packets which match any of the registered frame types and are not wanted by any protocol stacks also registered for the frame type.

Flow then advances to step S805 in which MLID 186 and LSL 187 monitor the network for any traffic. Specifically, in step S805, the network is monitored for packets addressed to the NIB's MAC address and for broadcast traffic, meaning that the destination of the traffic is unspecified (i.e., "to anyone"). Ordinarily, broadcast traffic is identified by a global specification for the destination media access control (MAC) address, for example 12 hexadecimal F's in sequence. Until LAN broadcast traffic is detected, pre-scanning program 84 does nothing.

Figure 9A:
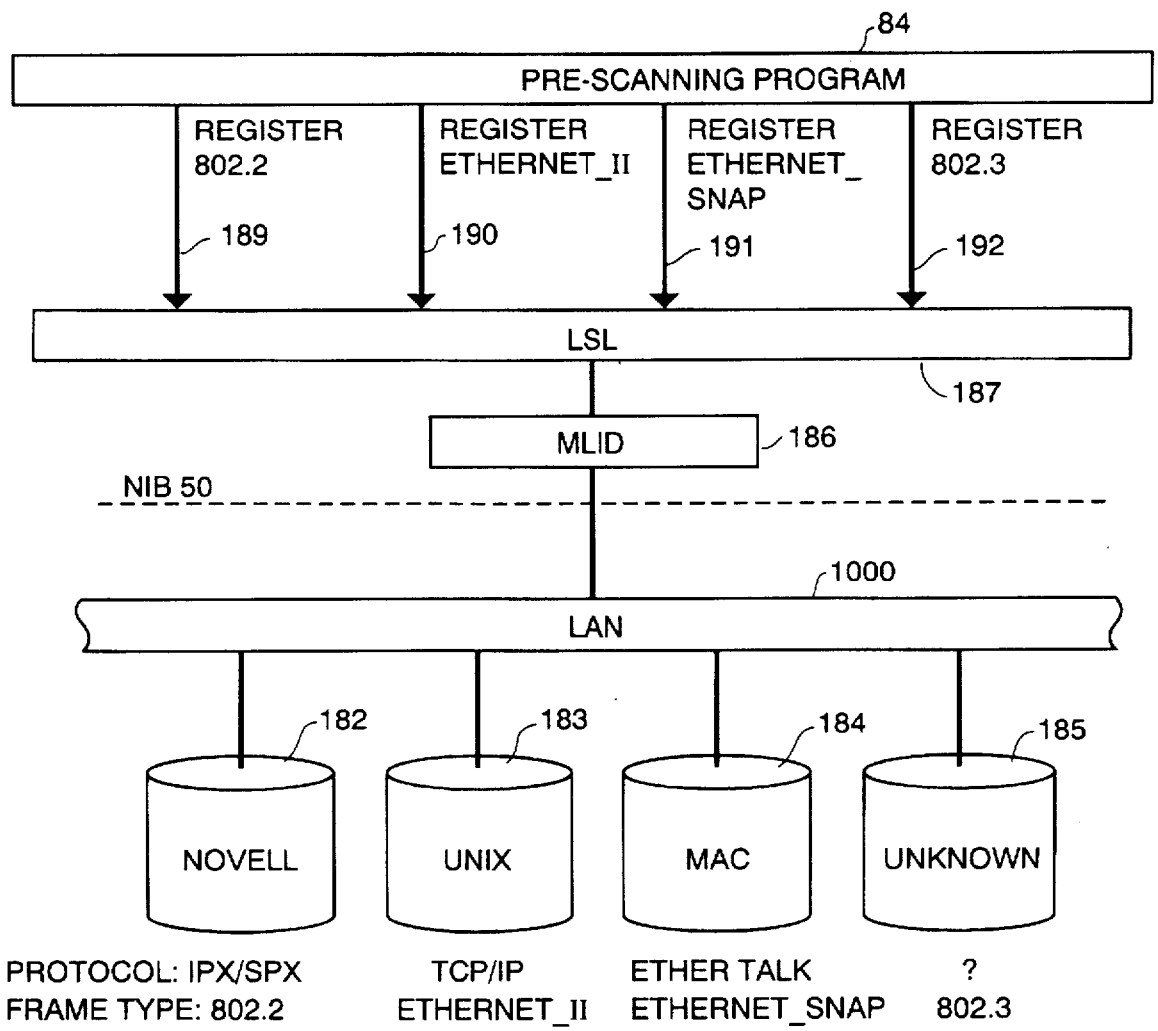
FIGS. 9(a) through 9(d) are diagrams for an example in which a frame type pre-scanning program registers with IPX on 802.2, which shows relationships of various network software modules during autosensing of frame types.
Figure 9B:
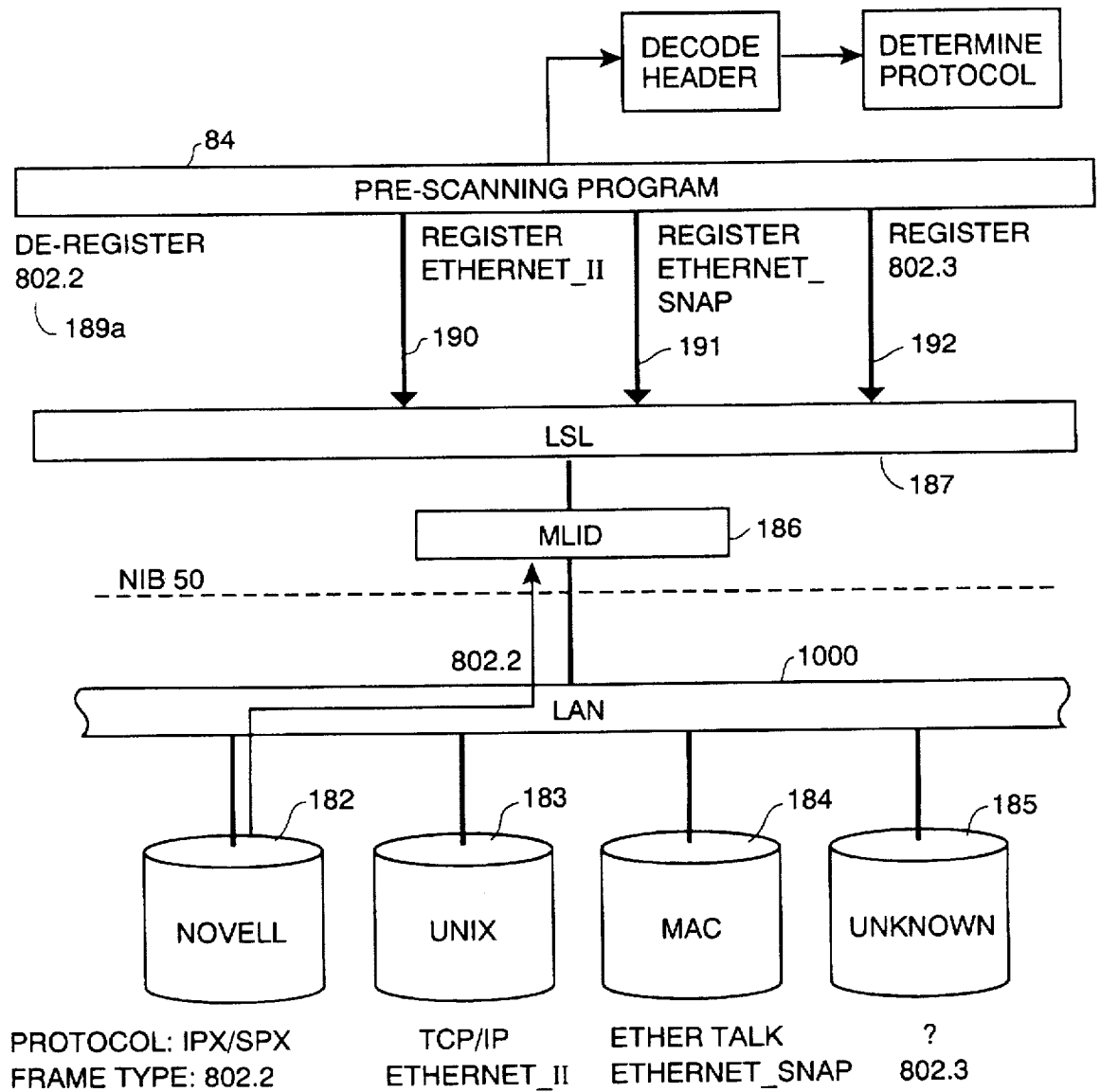
Figure 9C:
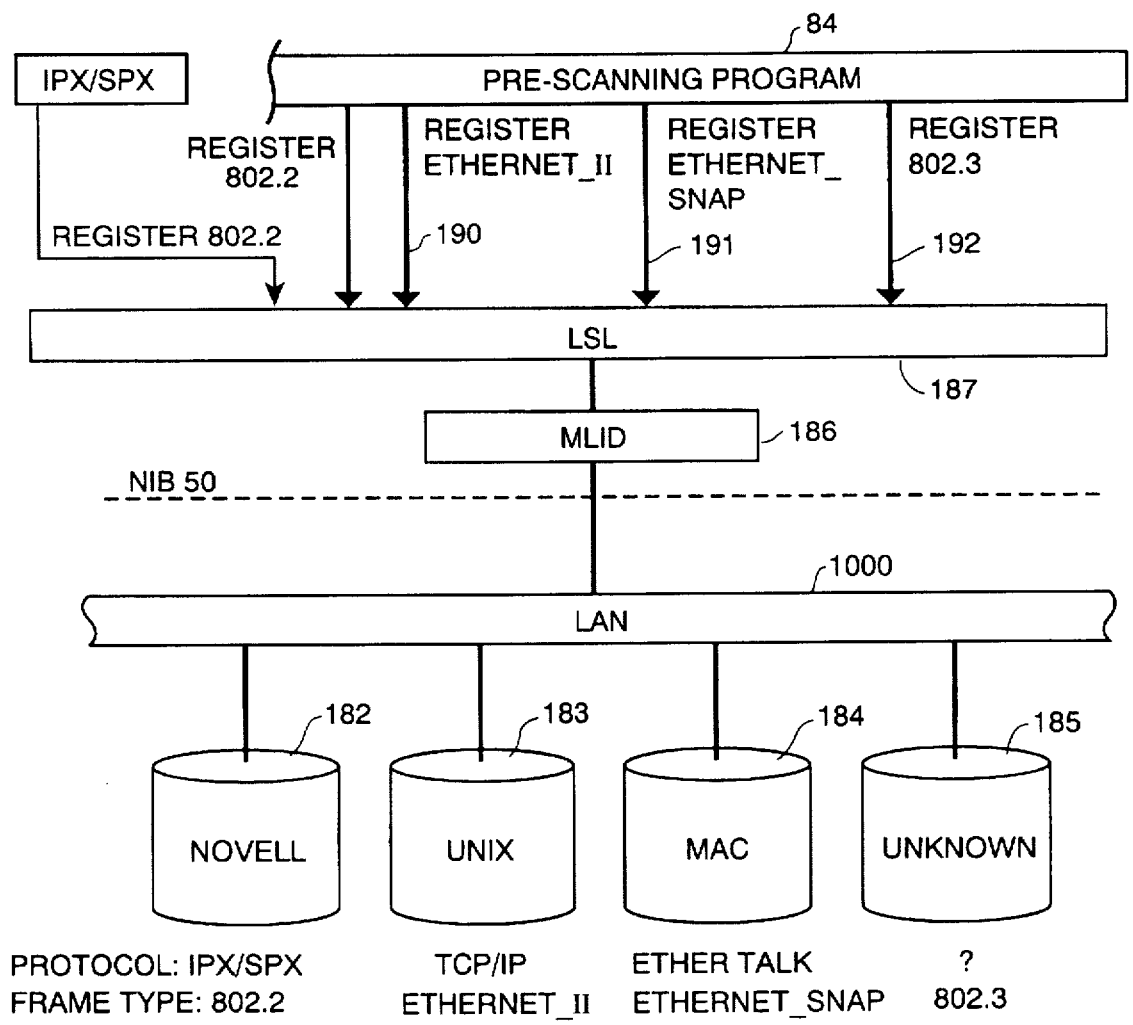
Figure 9D:
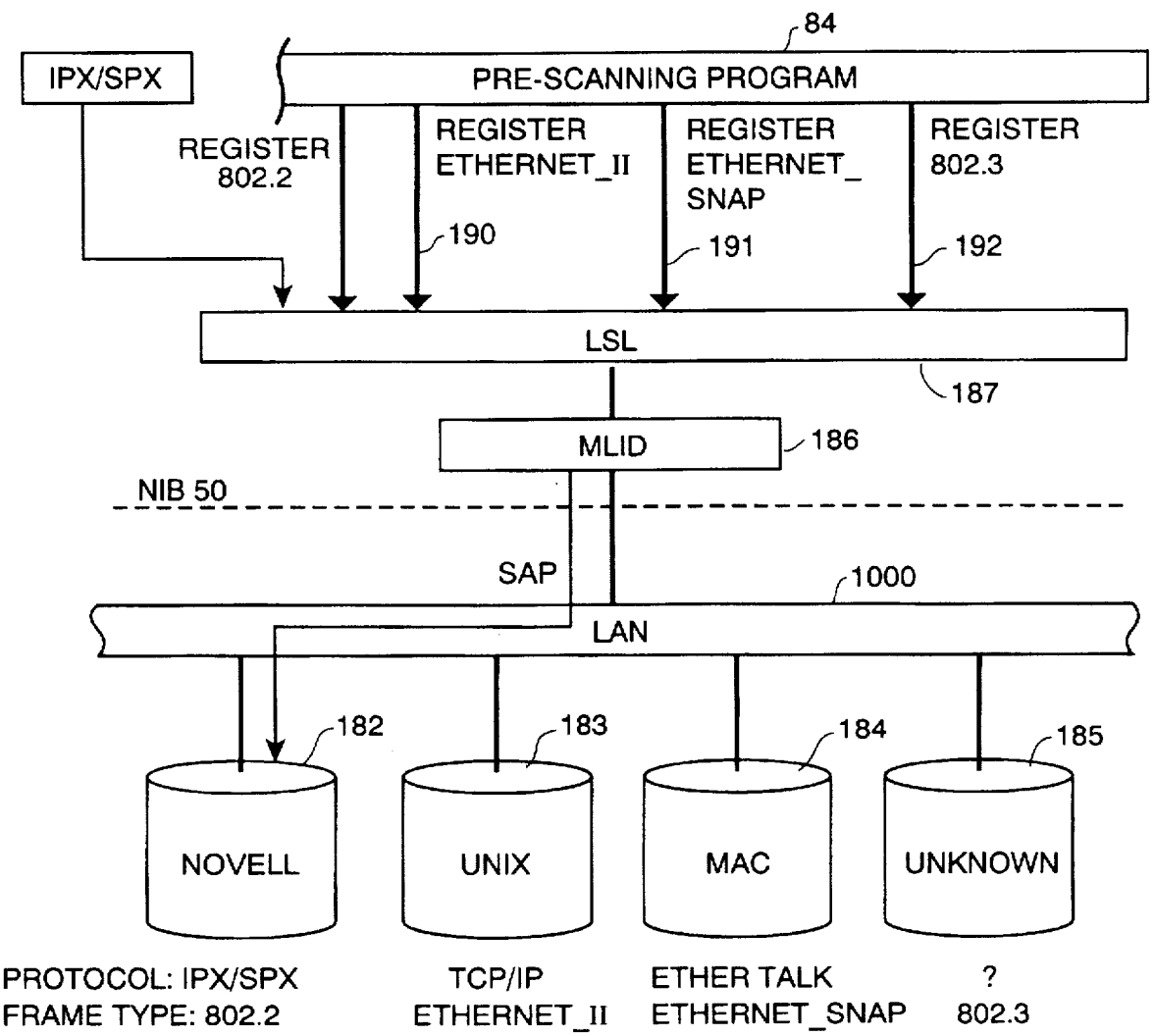

At this point in pre-scanning program 84's execution, the relationship of the various software modules is as depicted in FIG. 9(a). As seen there, it is possible for multiple network devices, such as devices 182, 183, 184, and 185, each of which runs a different protocol, all to be connected to a single LAN 1000. The devices may use the same or different frame types. In FIG. 9(a), device 182 is a Novell device running an IPX/SPX protocol using an 802.2 frame type; device 183 is a UNIX network device running a TCP/IP protocol using an Ethernet_II frame type; device 184 is a Macintosh device running an Ethernet protocol using an Ethernet_SNAP frame type; and network device 185 is an unidentified frame and protocol device using an 802.3 frame type. Of course, the combinations shown in FIG. 9(a) are illustrative only.

NIB 50 is also connected to LAN 1000 and includes LSL 187 loaded on top of MLID 186. Pre-scanning program 84 is shown as having registered each of the different frame types which may be exchanged on LAN 1000. Thus, as shown in FIG. 9(*a*), which depicts an Ethernet environment, pre-scanning program 84 has registered 802.2 at 189, Ethernet_II at 190, Ethernet_SNAP at 191, and 802.3 at 192.

When LAN broadcast or NIB-directed traffic is detected, flow advances to step S806 of FIG. 8 in which LSL 187 provides the frame packet to pre-scanning program 84. In step S807, pre-scanning program 84 decodes the frame's protocol header so as to identify the protocol in use by that frame packet. This header varies depending on the frame type the protocol is using.

FIG. 9(*b*) illustrates this sequence. As seen in FIG. 9(*b*), network device 182 has issued a broadcast frame packet using an 802.2 frame type. Since pre-scanning program 84 has registered 802.2 with LSL 187, at 189 as shown in FIG. 9(*a*), LSL 187 provides the frame packet to pre-scanning program 84. Pre-scanning program 84 decodes the frame's protocol header using the above table so as to determine the protocol in use on that frame type.

Examples of allowable frame types for IPX/SPX, TCP/IP, and AppleTalk are as shown in the following Table 3:

TABLE 3

| IPX/SPX | TCP/IP | AppleTalk |
| --- | --- | --- |
| Ethernet_II | Ethernet_II | Ethernet_II (Phase 1) |
| Ethernet_SNAP | Ethernet_SNAP | Ethernet_SNAP (Phase 2) |
| 802.2 | | |
| 802.3 | | |

As is evident from the above list, it is possible for two of the frame types (Ethernet_II and Ethernet_SNAP) to be used by different protocols. It should also be noted that it is permissible for the same frame type to be used by different protocols on the same LAN. Since pre-scanning program 84 remains registered with LSL 187 for all frame types, detection is possible even for frame types for a protocol different from those already registered by pre-scanning program 84 and is required in connection with a configurator function described below. By this arrangement, NIB 50 can be reconfigured by a device communicating on the network using a protocol for which no protocol stack is loaded in NIB 50 or a protocol/frame type combination which NIB 50 is not pre-configured to receive.

In step S808, pre-scanning program 84 determines whether autosensing is complete, i.e., whether all protocols for which autosensing is to be performed have been assigned a frame type. If not, flow returns to step S805 to monitor LAN broadcast traffic. On the other hand, if all protocols requiring autosensing have been assigned a frame type, flow proceeds to step S809. In step S809, pre-scanning program 84 terminates its pre-scan operation but remains resident in DRAM 360 to perform the configurator operation discussed below. Pre-scanning program 84 also issues a command to cause the required protocol stacks to be loaded. The configurator function described below is performed before, during, and after any autosensing.

In step S810, the newly-loaded protocol stacks register with LSL 187, as shown, for example, in FIG. 9(*c*). As seen there, the, IPX/SPX protocol stack registers 802.2 with LSL 187. By registering, and as described above, IPX/SPX informs LSL 187 to provide all frame packets matching the registered frame type (here, 802.2) to the newly-loaded protocol stack. Further, the configurator always stays registered to all frame types. Thus, in the example for 802.2 frame packets, any packet the IPX protocol stack doesn't want will be passed on to the pre-scanning program 84/configurator module.

When a protocol stack is loaded, a software interrupt is performed to obtain a table of entry points into various service routines provided by LSL 187. Thereafter, when the protocol stack wishes to utilize an LSL service routine, it merely performs a call to the memory address serving as the entry point to the desired routine.

As shown in FIG. 9(*d*), once a protocol stack has been loaded, it begins to operate on the network. Specifically, whereas pre-scanning program 84 was completely passive and did not broadcast any network communications, protocol stacks broadcast their associated requests. For example, IPX/SPX broadcasts its associated SAP requests, and TCP/IP broadcasts its associated RARP's so as to obtain its address from the nearest network server.

[3.2 Processing Of Received Packets]

Figure 10:
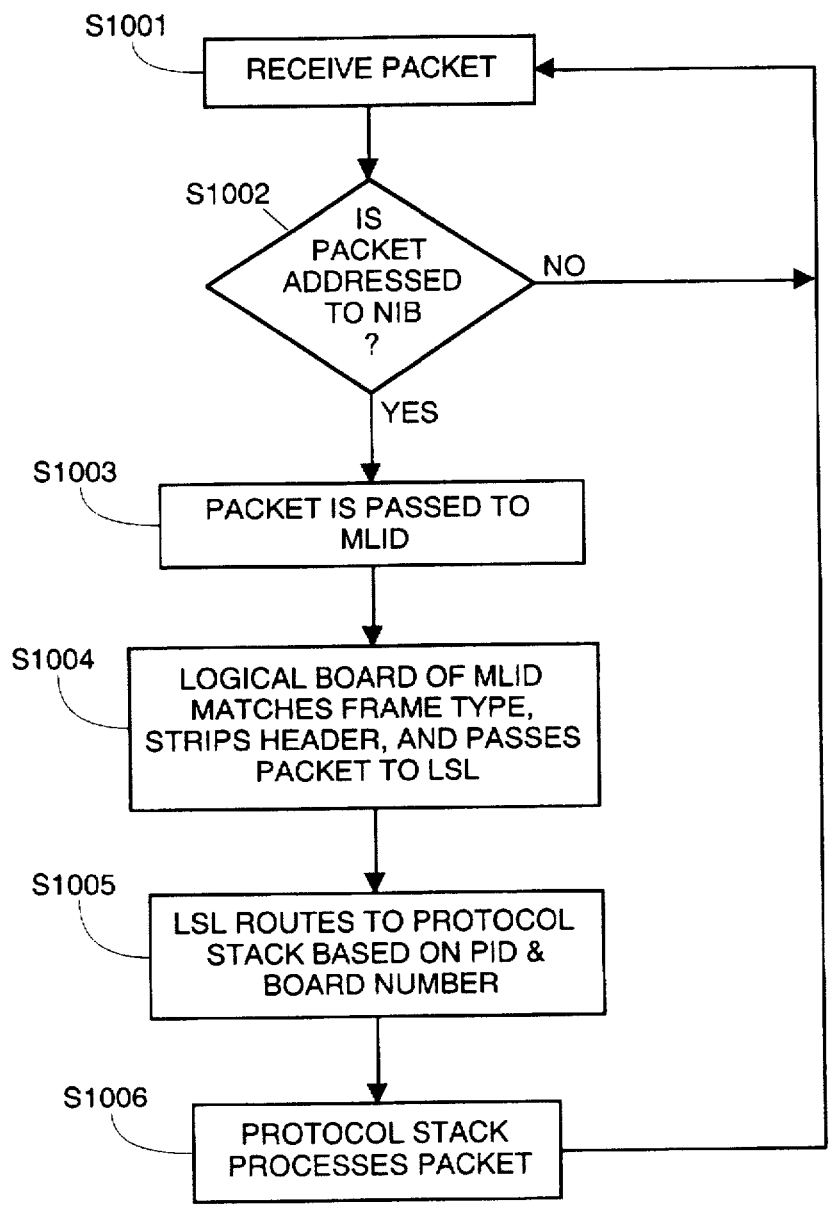
FIG. 10 is a flow diagram showing a process for receiving a packet from a network.

FIG. 10 is a flow diagram showing a process for receiving a packet from LAN 1000. In step S1001, a packet is received by a network interface chip, such as network controller 330 in an Ethernet environment. Network controller 330 determines in step S1002 whether the packet is addressed to NIB 50. Every packet transmitted on LAN 1000 has a header including network destination information. For example, the network destination may be the MAC address of a specific device, i.e., a direct transmission, or the destination may be all devices, i.e., a broadcast to hexadecimal address $FFFFFFFFFFFF_H$, for example. Generally, the destination address information is processed at the hardware level, e.g., by network controller 330, to determine if the packet is intended for reception by NIB 50. Accordingly, packets that are not intended for NIB 50 are never passed to the software executed on processor 300. Rather, only packets intended for NIB 50, such as broadcast or multicast or specifically-addressed packets, are passed on for further software processing.

If the packet is not addressed to NIB 50, either specifically or as part of a group (e.g., broadcast or multicast), flow returns to step S1001 and the packet is discarded. If the packet is addressed to NIB 50, the packet is passed to MLID 186 in step S1003. As described above, MLID 186 is the lowest level software that communicates with the network.

In step S1004, after MLID 186 receives a packet from network controller 330, each of the logical boards determines if the packet frame type is the type processed by that board. The board that processes the matching frame type strips off the frame header and passes the packet to LSL 187. Flow proceeds then to step S1005. In step S1005, LSL 187 uses the board number of the logical board which forwards the packet and the Protocol ID (PID) to route the packet to the appropriate protocol stack, and flow advances to step S1006. In step S1006, the protocol stack processes the packet and routes the packet to a peripheral server, such as CPSERVER 79, for servicing. Flow then returns to step S1001. Of course, different packets can be at different stages of the process in FIG. 10 at the same time.

Figure 11:
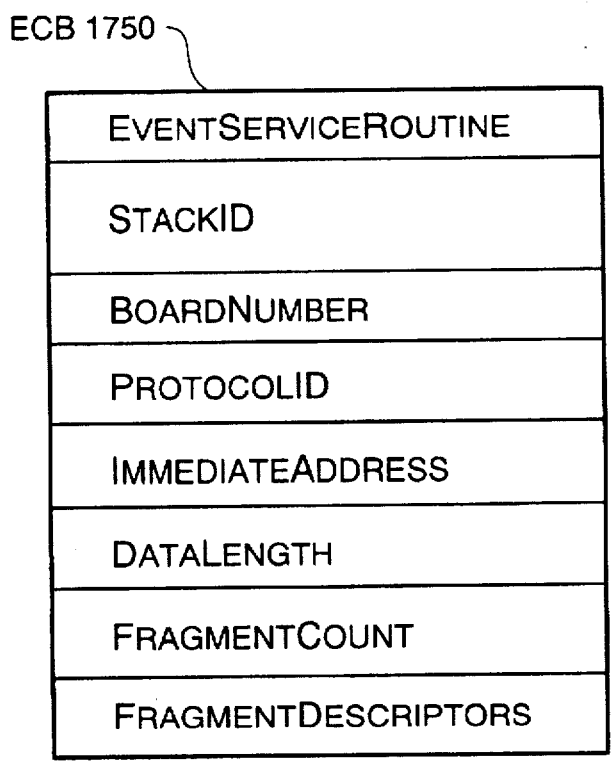
FIG. 11 shows a format of an event control block used in receiving and transmitting packets.

Referring to FIG. 11, when a protocol stack wishes to transmit a packet on LAN 1000, it does so using an Event Control Block (ECB) 1750. As shown in FIG. 11, ECB 1750 includes the following information fields, as described in the above-mentioned ODI specification: EventServiceRoutine, StackID, BoardNumber, ProtocolID, ImmediateAddress, DataLength, FragmentCount, and FragmentDescriptors.

BoardNumber is the number of the logical board in MLID 186 that handles the frame type used by the protocol stack. The logical board to which a protocol stack is bound, i.e., to which it sends data packets and from which it receives data packets, can be set in a configuration file, e.g., NET.CFG. In the preferred embodiment, since the order of logical boards is known, the board number to which each protocol stack should be bound is also known and is hard coded into the protocol stack software modules. Alternatively, the protocol stack can determine the board number of the board to which it should be bound, i.e., the board which handles the frame type used by the protocol stack, by examining the frame type ID values in the configuration table for each board.

Using the service routines provided by LSL 187, the protocol stack can obtain an entry point to a service routine of MLID 186, which is then used to obtain the locations of the configuration tables. The protocol stack then can examine the frame type ID values from the configuration tables to determine which board handles the frame type used by the protocol stack. The number of that board is then used in ECB 1750. Since LSL 187 and MLID 186 do not alter ECB 1750, the board number does not have to be redetermined each time a packet is sent, but instead can be set in ECB 1750 once during initialization.

The ImmediateAddress field of ECB 1750 contains the destination address that specifies to which node on LAN 1000 the packet should be sent. This can be a direct, multicast, or broadcast address. A multicast involves sending a packet to each member of a group, instead of sending the packet to every device on the network using a broadcast. The format of Ethernet multicast addresses differs from that of token ring multicast addresses. Thus,. in contrast to direct transmissions or broadcasts, multicasts require that the protocol stack be aware of the network media type, in order to provide the appropriate multicast address format to MLID 186. The protocol stack can, for example, obtain the network media type, or a specific address format for multicast use, from a configuration file, e.g., NET.CFG, as in a conventional approach. The present invention provides an alternative method, as discussed below.

Figure 12:
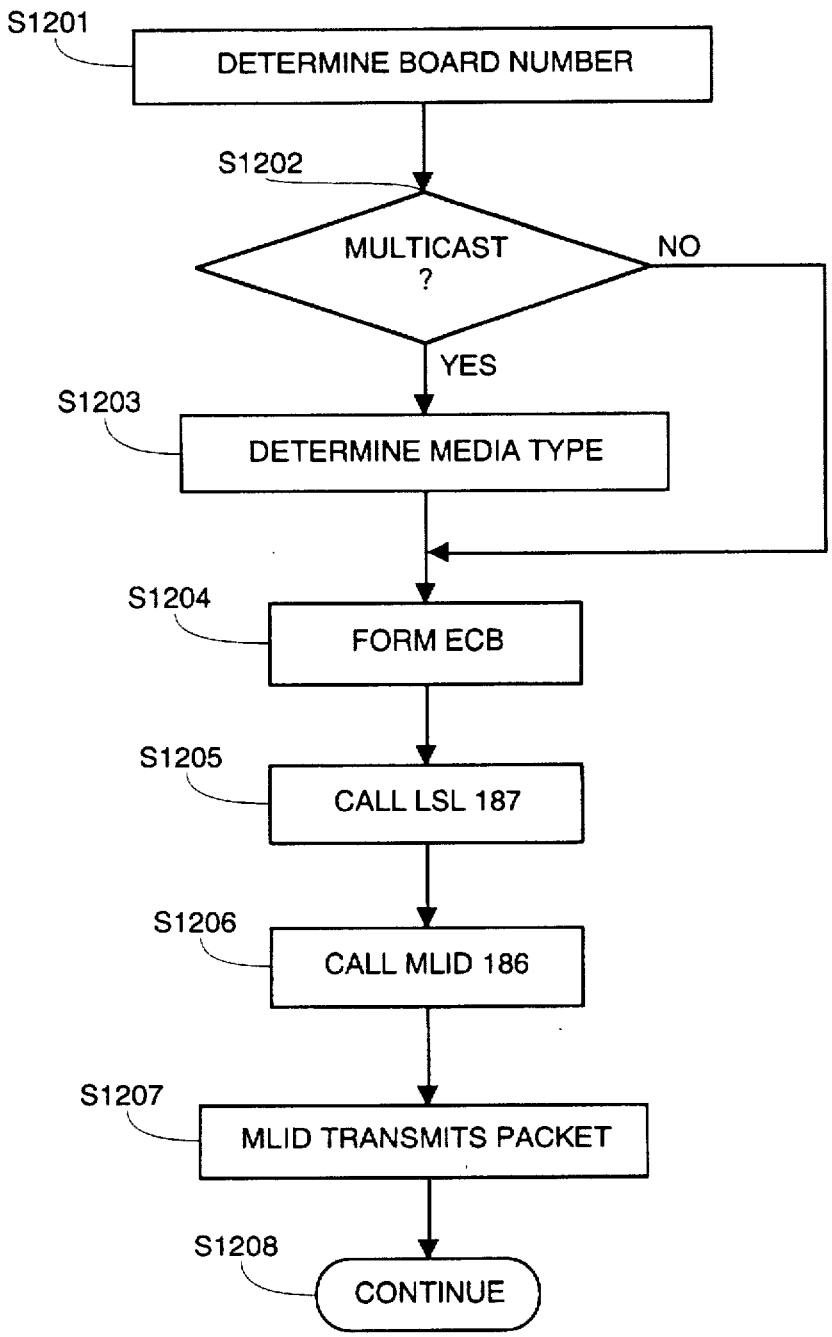
FIG. 12 is a flow diagram showing a process for transmitting a packet to a network.

FIG. 12 is a flow diagram illustrating a process for transmitting a packet on LAN 1000. In step S1201, the protocol stack determines what board number should send the packet, if necessary because the board number is not hard coded, in the manner discussed above. In step S1202, the protocol stack determines whether the transmission is a multicast. If it is not a multicast, the process skips ahead to step S1204. If the transmission is for a multicast, flow advances to step S1203. In step S1203, the appropriate address format for the multicast is determined. This may involve retrieving a multicast address format from a configuration file or determining the media type. Since the media type will not change, it need only be determined once. Appropriate data can then be stored so that the protocol stack knows the media type the next time a multicast is transmitted. Flow then advances to step S1204.

In step S1204, the protocol stack forms an ECB 1750 having the information mentioned above. Flow then advances to step S1205, in which the protocol stack calls LSL 187 with a pointer to the memory location of the ECB. Flow then advances to step S1206, in which LSL 187 calls the board of MLID 186 designated by the ECB. Flow then advances to step S1207, in which the MLID board transmits the packet on LAN 1000. Flow then advances to step S1208 to continue with other processing.

[3.3 Dynamic Detection Of Media Type]

The present invention provides a method for dynamically detecting the network media type so that a protocol stack can be written generically to execute in either an Ethernet or a token ring environment.

Figure 13:
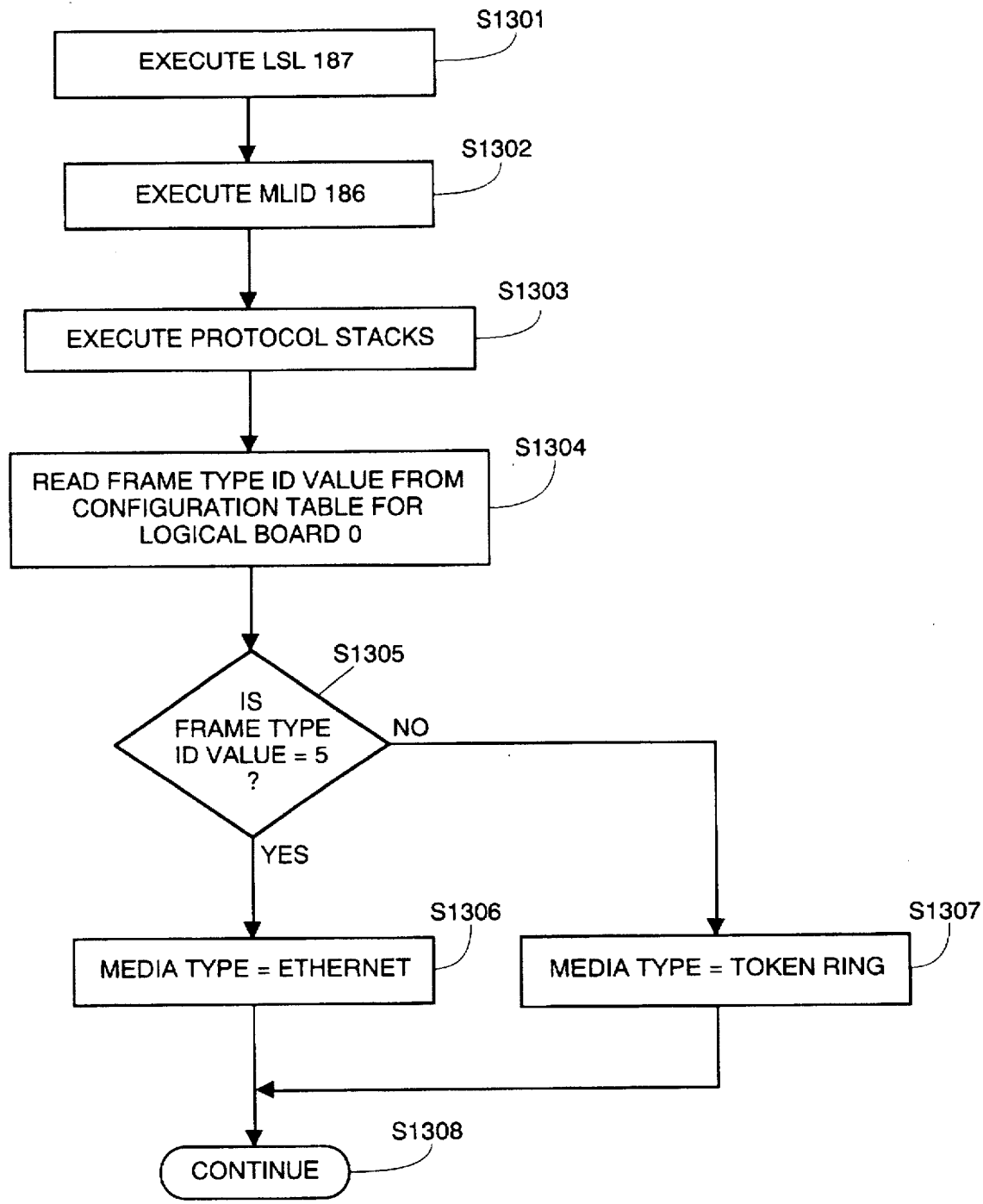
FIG. 13 is a flow diagram showing a process for dynamically determining a network media type.

FIG. 13 is a flow diagram illustrating a process for dynamically determining a media type of a local area network (LAN) to which a network device is connected. Briefly, a network interface driver software module is executed which is the lowest level of software to communicate with the LAN and which handles the sending and receiving of communication packets to and from the LAN by appending or stripping off packet frame headers. The network interface driver software module has one or more logical boards for processing communication packets having different respective frame types and has one or more configuration tables, each respectively associated with one of the logical boards, which each include a frame type identifying value that identifies a combination of frame type and media type for packets processed by the corresponding logical board. The network interface driver software module also has a service routine which can be accessed via an entry point. One or more protocol stack modules are executed for processing packets that use different respective protocols, and a multiplexer software module is executed which interfaces between the network interface driver software module and the one or more protocol stack modules and which routes packets from the network interface driver software module to the respective protocol stack modules according to the protocol used by the packets. The entry point of the network interface driver service routine is obtained via the multiplexer module. A location of one of the configuration tables is then obtained via the service routine. The frame type identifying value in the one configuration table is then read, and the network media type is determined by comparing the frame type identifying value read from the one configuration table to one or more values that correspond to a predetermined media type.

More specifically, in steps S1301, S1302, and S1303, microprocessor 300 loads and executes LSL 187, MLID 186, and one or more protocol stack modules as shown in steps S801, S802, S809, and S810 of FIG. 8. Process steps S1304 through S1307 then can be performed to determine the media type dynamically at any point after a protocol stack has obtained the entry points into service routines of LSL 187, either as part of the initial loading and execution of the protocol stack or at a later time.

In step S1304, the frame type ID value is read from the configuration table corresponding to logical board 0 in MLID 186, then flow advances to step S1305. The frame type ID value is read by calling a service routine of LSL 187 which provides the entry point for a service routine of MLID 186. The service routine of MLID 186 is then called to obtain the location, i.e., starting memory address, of the configuration table. The frame type ID value is then read directly from the configuration table.

In step S1305, the frame type ID value is compared to the value 5. As shown above in Tables 1 and 2, the standard frame type ID values are assigned in such a way that the value is unique for each different frame type and media type. In the preferred embodiment, when an Ethernet medium is used, the four logical boards are arranged so that logical board 0 is the 802.3 frame type board. As shown in Table 1, the frame type ID value for that board is 5. On the other hand, if a token ring medium is used, the first logical board is for a Token-Ring frame type and has a frame type ID value of 4.

Thus, if the frame type ID value read from logical board 0 is determined to be equal to the value 5 in step S1305, flow advances to step S1306 which makes a determination that the media type is Ethernet. That information may be stored in configuration file 75 or in DRAM 360. Flow then advances to step S1308 and microprocessor 300 continues with other processing.

If the frame type ID value is not equal to the value 5 in step S1305, flow advances to step S1307 which makes a determination that the media type is token ring. Flow then advances to step S1308 to continue with other processing.

There are, of course, many variations on the above process. For example, the frame type ID value for a different logical board can be read and compared to a value other than 5. Also, if the frame type ID value is not equal to 5 in step S1305, it can be expressly compared to the value 4 to verify that logical board 0 is for a token ring medium. If the frame type ID value for logical board 0 does not equal either 4 or 5, the protocol stack can recognize that a problem exists, e.g., the logical boards are incorrectly configured or a proprietary network that is neither Ethernet nor token ring is being used.

Further, the frame type ID value for a logical board can be compared to the entire set of values that a board may have for a given media type. For example, Table 1 indicates that the frame type ID value for boards on an Ethernet medium will be either 2, 3, 5, or 10. If a frame type ID value read from a board is not in that set, a token ring medium can be assumed. Likewise, the frame type ID value for boards on a token ring network will be either 4 or 11. Thus, if the frame type ID value is not in that set, an Ethernet medium can be assumed.

In this way, a protocol stack can determine the media type dynamically without having any knowledge beforehand concerning the arrangement of logical boards, and without any special interaction with the network interface driver module. All that is necessary is a multiplexer module and network interface driver module which conform to the ODI specification, or which at least have an ODI-conforming configuration table and a way to access the information in it. Accordingly, the protocol stack can be written generically, including code to perform steps S1304 through S1308, and can be loaded into any network device meeting the above conditions regardless of media type.

[3.4 Reconfiguring Frame Type Assignments/Protocols]

As mentioned above, a portion of pre-scanning program 84 provides a so-called configurator function which allows changes to be made to configuration information regarding which protocol stacks are loaded and which frame type is assigned to each loaded protocol stack.

Figure 14A:
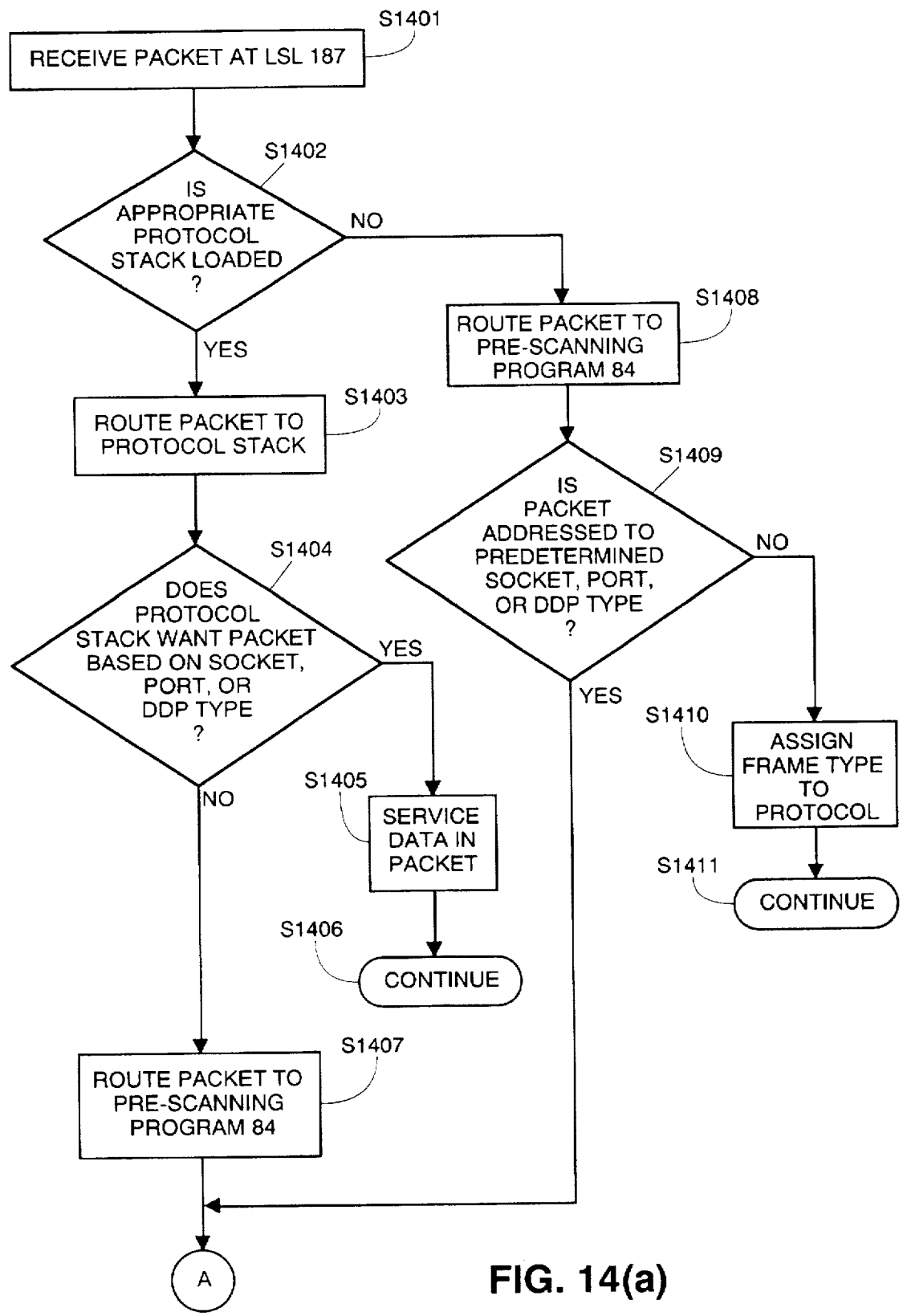
FIGS. 14(a) and 14(b) are flow diagrams showing a process for reconfiguring which protocol stacks are loaded and/or which frame types are assigned for loaded protocol stacks.
Figure 14B:
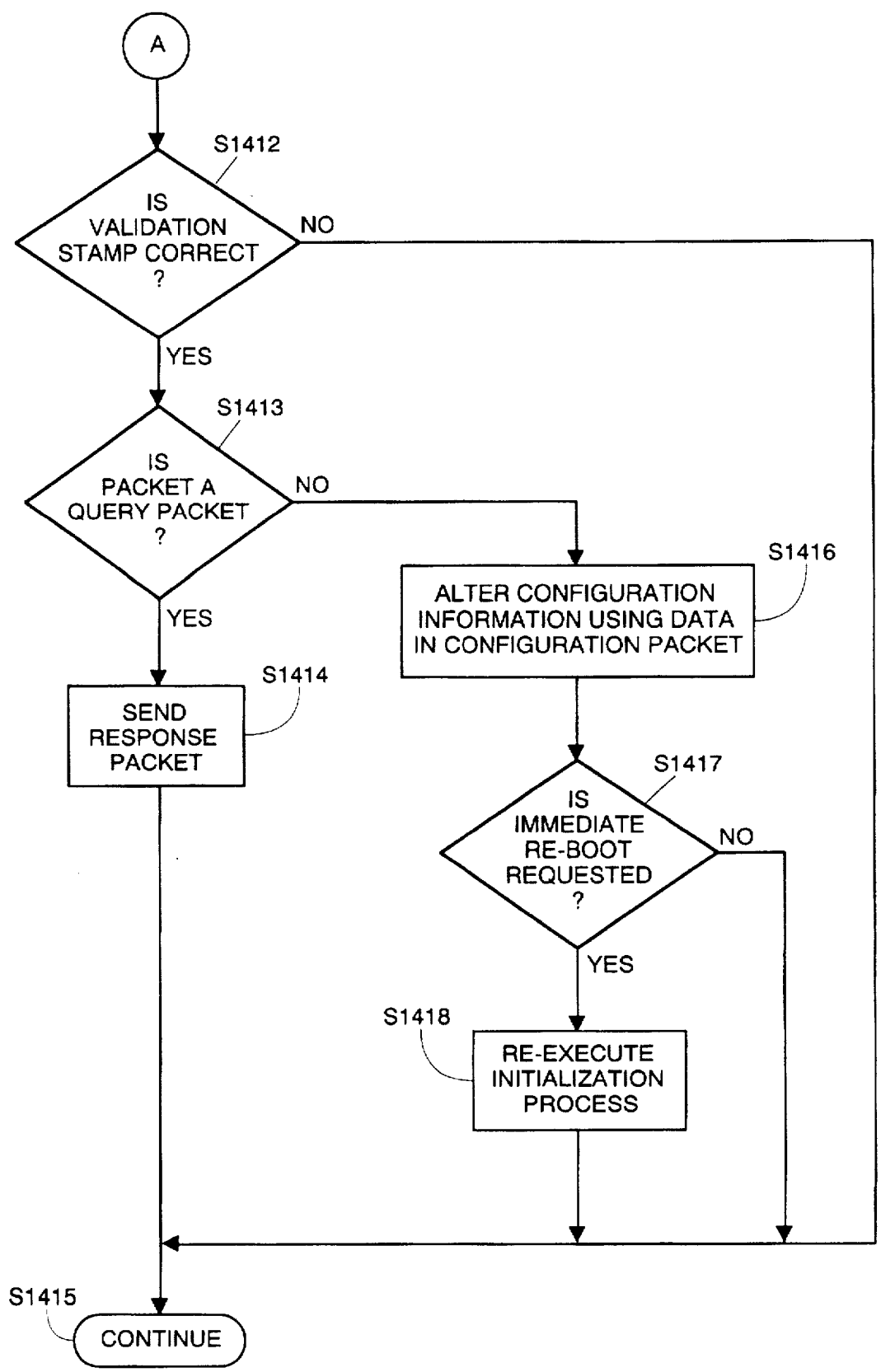

FIGS. 14(a) and 14(b) show a flow diagram which illustrates a process for reconfiguring frame type assignments for protocol stack modules in a network interface device which is interfaced to a local area network (LAN). Briefly, an initialization process is executed which loads protocol stack modules and assigns frame types to each of the loaded protocol stack modules based on configuration information regarding the protocols and frame types used on the LAN. Packets are received which include data and address information from the LAN, and a determination is made whether a received packet is a configuration packet by detecting whether the packet is addressed to the NIB by using a predetermined address, e.g., the packet is addressed to the NIB's specific assigned address and has the correct validation stamp. In response to a determination that the received packet is a configuration packet, the configuration information is altered using the data in the configuration packet. The initialization process is subsequently reexecuted using the altered configuration information.

In more detail, in step S1401 a packet is received by LSL 187. The packet has been routed to this point based on header information including destination address information, which is identical in a configuration packet to the header information in a packet containing data to be serviced. Thus, LSL 187 cannot distinguish a configuration packet from other packets and determines the protocol stack to which the packet should be routed in the same manner as for other packets. In step S1402, a determination is made whether the appropriate protocol stack is loaded. If the protocol stack is loaded, flow advances to step S1403 in which the packet is routed to the appropriate protocol stack, then flow advances to step S1404. If the protocol stack is not loaded, flow advances to step S1408 in which the packet is routed to pre-scanning program 84. In addition, as described below, the packet is also routed to pre-scanning program 84 if the protocol stack declines the packet.

In the preferred form presently described, a packet for a loaded protocol stack is first routed to the protocol stack even when the packet is a configuration packet. However, since the protocol stack does not know anything about the configuration packet, it declines it. Handling of the configuration packet then passes to pre-scanning program 84. It is possible to modify LSL 187 to distinguish configuration packets and avoid routing them to a protocol stack. However, since relatively few packets are likely to be configuration packets, it is preferable not to modify LSL 187 but instead to have a protocol stack determine whether a packet is a configuration packet. In this way, if a protocol stack is registered to receive the frame type used by a packet, the protocol stack gets the first chance to accept and process the packet, and most of the time that is what happens. Only if the protocol stack declines the packet is it passed to the configurator.

Figure 15A:
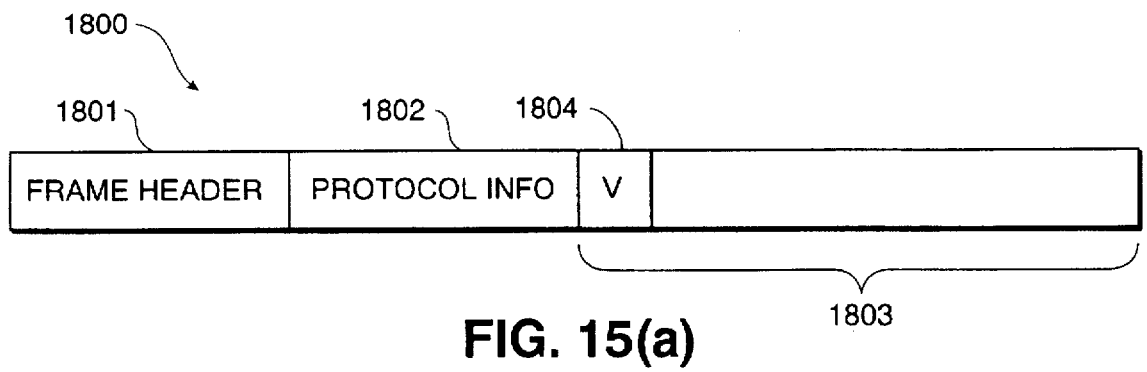
FIGS. 15(a) through 15 (d) illustrate formats for different packet types used in connection with reconfiguration.

Accordingly, in step S1404 a determination is made whether a packet is a configuration packet by determining whether the protocol stack will accept or decline the packet. A decision to accept or decline the packet is made based on detection of whether address data in the packet indicates the NIB's assigned MAC address and whether it includes an identifying "stamp". FIG. 15(a) shows a format of a configuration packet 1800 in the preferred embodiment. 1801 designates frame header information including the destination address information used to route the packet over LAN 1000 to the appropriate node, NIB 50 in this case. 1802 designates protocol header information which includes the information used by LSL 187 to route the packet to an appropriate protocol stack. 1803 designates data which will be discussed below.

The protocol information 1802 differs in form for different protocols. For example, an IPX/SPX packet will include address data that designates a socket, a TCP/IP packet will include address data that designates a port, and an AppleTalk packet will include address data that designates a DDP type. A predetermined socket, port, and DDP type are each reserved for designating configuration packets. Accordingly, the determination in step S1404 of whether the packet is a configuration packet 1800 is performed by detecting whether the packet contains a protocol-specific "stamp" (such as a predetermined socket for IPX/SPX, a predetermined port for TCP/IP, or a predetermined DDP type for AppleTalk) identifying it as a configuration packet. In other words, it is determined whether the packet is addressed to any of the predetermined socket, port, or DDP type. If the packet does not contain any of the predetermined addresses, flow advances to step S1405 in which the packet data is serviced, and then flow advances to step S1406 to continue with other processing.

If it is determined in step S1404 that the protocol stack does not want the packet, e.g., the packet is addressed to one of the predetermined addresses, flow advances to step S1407 in which the packet is routed to pre-scanning program 84. Flow then advances to step S1412 shown in FIG. 14(b). Thus, configuration packets are routed to pre-scanning program 84/configurator if (a) no protocol stack is bound for the frame type used by the packet, or (b) all protocol stacks bound to the frame type reject the packet (based on a port, socket, DDP type, etc., to which the packet is addressed).

As mentioned above, the packet is routed to pre-scanning program 84 in step S1408 if it is determined by LSL 187 in step S1402 that a protocol stack is not loaded for the protocol used by the packet. Since in the preferred embodiment pre-scanning program 84 does not de-register frame types which may be used by a protocol for which no frame type is assigned, as discussed above, all possible frame types on LAN 1000 are bound to a loaded protocol stack and/or pre-scanning program 84. Accordingly, a configuration packet 1800 can be received and processed even if it is sent by a device using a protocol and frame type for which NIB 50 has no loaded protocol stack.

After the packet is routed to pre-scanning program 84 in step S1408, flow advances to step S1409 in which a determination is made whether the packet is addressed to the predetermined socket, port, or DDP type. This step is like step S1404 discussed above. If the packet is not addressed to one of the predetermined addresses used to designate a configuration packet 1800, flow advances to step S1410 in which the received frame type is assigned to a protocol as in steps S807 through S810, and flow advances to step S1411 to continue with other processing. If it is determined in step S1409 that the packet is a configuration packet 1800, i.e., it is addressed to the predetermined socket, port, or DDP type, then flow advances to step S1412.

Figure 15B:
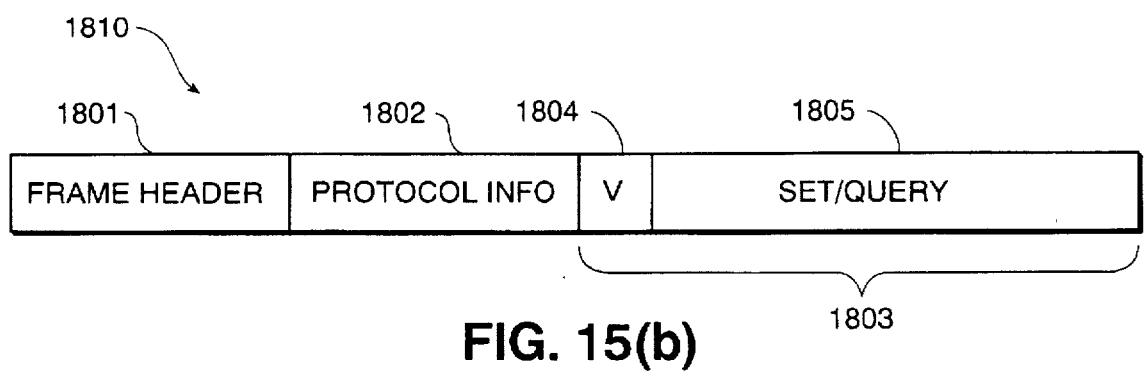
Figure 15C:
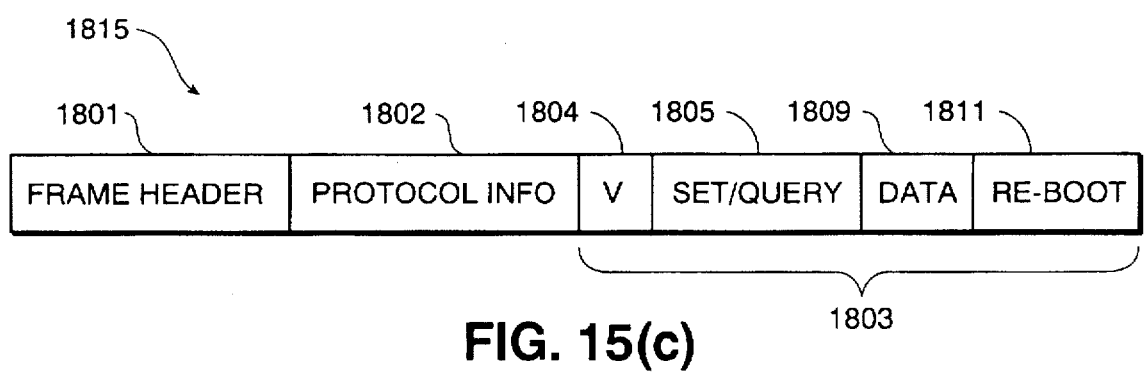

In step S1412, a validation stamp 1804 which is part of the data 1803 of the configuration packet 1800 is checked to confirm that the configuration packet is valid. The validation stamp 1804 is an optional feature for added security which may be omitted. The validation stamp is preferably a sequence of alphanumeric characters such as an abbreviation of the software provider's name. Alternatively, the validation stamp can be a code sequence of characters. If the validation stamp is not correct, the process skips ahead to step S1415 to continue with other processing. If a correct validation stamp is present, flow proceeds to step S1413 in which a determination is made whether the configuration packet is a query packet 1810. FIG. 15(b) shows the format of a query packet 1810, and FIG. 15(c) shows the format of a set packet 1815. Both query packet 1810 and set packet 1815 have a set/query field 1805 in data 1803 of the packet. This field preferably has just one bit that is 1 if the packet is a set packet and is 0 if the packet is a query packet. As shown in FIG. 15(b), set/query field 1805 is the last item in query packet 1815.

Figure 15D:
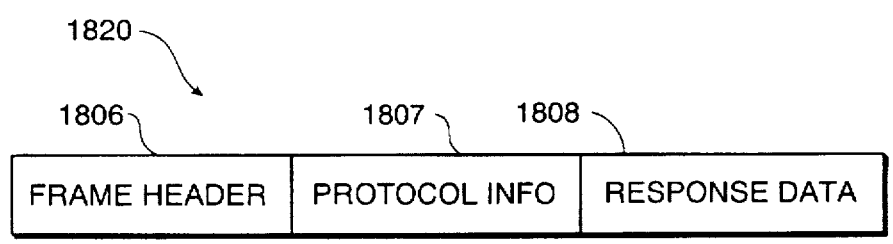

If the packet is a query packet, flow advances to step S1414 in which a response packet 1820 is sent. FIG. 15(d) shows the format of response packet 1820. Response packet 1820 includes frame header information 1806, protocol data 1807, and response data 1808. Frame header information 1806 and protocol data 1807 can be formed by swapping source and destination data in query packet 1810, to send response packet 1820 back to the device that sent query packet 1810. Response data 1808 indicates the protocol stacks that are currently loaded, and the frame type assignments for each loaded protocol stack. This data can be obtained, for example, from configuration file 75 or from LSL 187. After sending the response packet, flow proceeds to step S1415 to continue with other processing. In the preferred form, a query packet is received first, before any set packet, so that the current configuration information can be provided to a user, e.g., the system administrator, who wishes to change a protocol or frame type configuration.

If the received packet is not a query packet, it is deemed to be a set packet and flow advances to step S1416. Set packet 1815 includes configuration data 1809 as shown in FIG. 15(c). Configuration data 1809 preferably includes an indication for each protocol stack of whether that stack should be loaded and includes a frame type to be used with each loaded protocol stack. Configuration data 1809 may also include other information, such as data identifying the media type or an IP address which is a software defined address similar in concept to the hardware defined MAC address. In step S1416, configuration data 1809 is used to alter the configuration information in configuration file 75. Flow then advances to step S1417.

In step S1417, a determination is made whether an immediate re-boot is desired. This determination is made based on re-boot data 1811 in data 1803 of set packet 1815. Re-boot data 1811 is preferably a one bit field which is 1 when immediate re-boot is desired and is 0 otherwise. If immediate re-boot is desired, flow advances to step S1418 in which the initialization process of FIG. 8 is reexecuted using the altered configuration information in configuration file 75. Flow then advances to step S1415 to continue other processing.

If re-boot data 1811 indicates that an immediate re-boot is not desired, flow proceeds from step S1417 to step S1415 to continue other processing. The altered configuration information will then be used in the initialization process the next time NIB 50 is powered-up or re-booted. It should be noted that, in some cases, the configuration of NIB 50 can be changed based on the altered configuration information without executing the initialization process. For example, if the altered configuration information merely requires the loading of an additional protocol stack that is not already loaded, it is possible to load that protocol stack into DRAM without reinitializing the device.

As described above, LSL 187 sends packets to pre-scanning program 84 if any appropriate protocol stack that has been loaded declines the packet because the packet is addressed to a predetermined socket, port, or DDP type. Thus, pre-scanning program 84 can receive a configuration packet at any time after it has been loaded and registered with LSL 187, whether or not any protocol stacks have been loaded. This means that a configuration packet can be received and used to alter the configuration information when the initialization process of FIG. 8 has executed only partly, for example through step S805, and before any protocol stacks are loaded. On the other hand, a configuration packet may be received and processed long after the initialization process of FIG. 8 has completed execution.

As described above, the present invention provides a configurator feature that has the ability to handle a configuration packet having any protocol and frame type combination, even if the network device is not configured to send and receive packets having that protocol/frame type combination.

Figure 16:
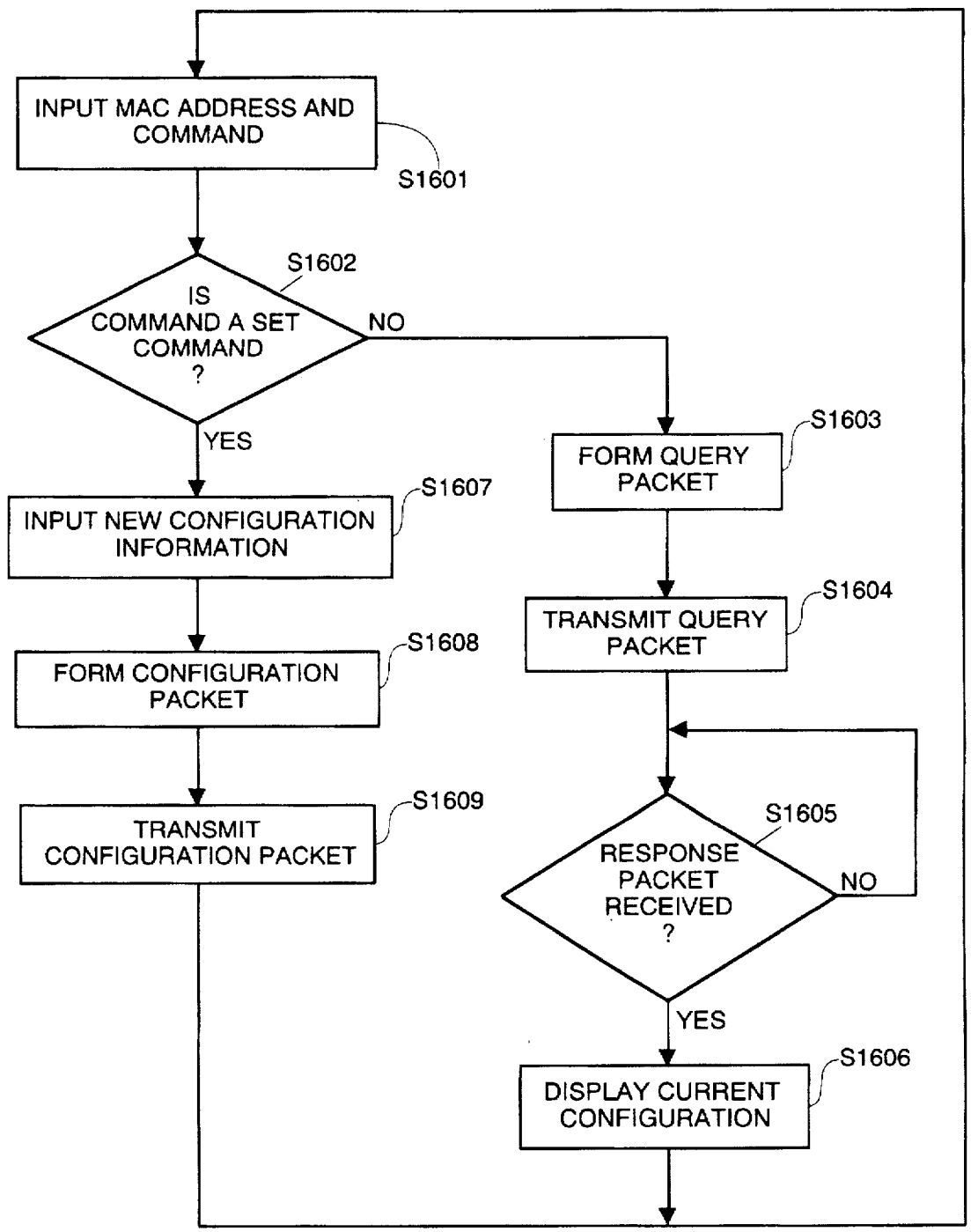
FIG. 16 is a flow diagram showing a process for transmitting new configuration information to a network device from a computer via a LAN.

FIG. 16 is a flow diagram showing a process for transmitting new configuration information to NIB 50 from another network device, such as computer 1500, via LAN 1000. Typically, at least one networked computer runs software that allows it to obtain and display information regarding other devices on the network. For example, Novell NetWare may be running on a PC under an IPX/SPX protocol. According to the present invention, a software program runs on a computer and extends the functions of NetWare software. The version of the program, called MPINIT, that runs on a DOS-based PC using an IPX/SPX protocol is a DOS MPINIT. There are other versions of MPINIT for other platforms. Thus, there is a UNIX MPINIT that runs on a UNIX-based system using a TCP/IP protocol, and a Macintosh MPINIT that runs on a Macintosh-based system using an AppleTalk protocol.

One extended function that MPINIT provides is a menu-selected option to set or query the configuration information of a particular network device. In step S1601 of FIG. 16, a MAC address of a device is input along with a command to QUERY or SET the configuration information for the designated device. This may not be necessary for some network configurations where the NIB can advertise its presence using a protocol and frame that the computer is set up for. Flow then proceeds to step S1602 in which a determination is made whether the command is a SET command. If the command is not a SET command, flow advances to step S1603. If the command is a SET command, flow advances to step S1607.

In step S1603, since a SET command was not detected in step S1602, processing is performed for a QUERY command. In a preferred embodiment, an initial query packet is sent by MPINIT without a user's specific request, in order to present a list of current NIB configuration information. The user may then cause a SET packet to be issued as desired. A query packet 1810 is formed using the MAC address input in step S1601 as the destination address information. Flow then advances to step S1604 in which query packet 1810 is transmitted to the designated network device, NIB 50 in this case, via LAN 1000 using whatever protocol and frame type is in use by computer 1500 executing MPINIT, which in the case of a DOS-based PC is IPX/SPX over the assigned frame type. In step S1605, the process waits until a response packet 1820 is received. When response packet 1820 is received, flow advances to step S1606 in which the current configuration information contained in response packet 1820 is displayed on a display device of the computer. Flow then returns to step S1601 to await another command.

In step S1607, if a SET command is detected in step S1602, new configuration information is input. The new configuration information can be input by keyboard and, if current configuration information of a designated device is being displayed in response to a QUERY command, the new configuration information can be input by editing the displayed information. Alternatively, the new configuration information can be input from a configuration file in computer 1500. After inputting the new configuration information, flow advances to step S1608.

In step S1608, a set packet 1815 is formed using the MAC address input in step S1601 and the new configuration information input in step S1607. MPINIT can be configured to set re-boot data 1811 to always request immediate re-boot by default, or a user can be prompted by the software to input re-boot data 1811. Flow then advances to step S1609 in which set packet 1815 is transmitted to the designated network device with the protocol used by computer 1500 executing MPINIT. Flow then returns to step S1601 to await another command.

As described above, pre-scanning program 84 processes packets in all frame types allowed on LAN 1000 in the most preferred embodiment. Accordingly, a Macintosh computer using AppleTalk can send a configuration packet to NIB 50 even if NIB 50 only has protocol stacks loaded for IPX/SPX and TCP/IP protocols. Pre-scanning program 84 will receive and process the configuration packet, and NIB 50 can be reconfigured to load an AppleTalk protocol stack and communicate with the Macintosh computer.

Further, the present invention is not limited to use only with peripherals. A configuration packet 1800 can also be sent to a computer if the computer includes the appropriate software to detect and process the configuration packet according to the above-described process. In this manner, a system administrator's computer can reconfigure other computers on LAN 1000 if a frame type used for a protocol is changed.

[4. Other Embodiments]

Although a preferred form of the present invention is described above in the context of NIB 50 for interfacing a digital copier to LAN 1000, the present invention is applicable to other network interface devices for interfacing other peripherals, such as printers, scanners, and facsimile devices, to LAN 1000. For example, the present invention can be used with the Network Expansion Board (NEB) described in U.S. Pat. No. 5,323,393 entitled "Method And Apparatus For Obtaining And For Controlling The Status Of A Networked Peripheral", hereby incorporated by reference. That patent discloses a PRESCAN module which performs autosensing of frame types, then terminates and causes protocol stacks to load. That PRESCAN module can be modified to perform the configurator function described in connection with FIG. 14, if the PRESCAN module is also modified to remain resident after completing its pre-scanning operation.

Further, the present invention can be used with Network Expansion Board disclosed in U.S. patent application Ser. No. 08/336,062, entitled "Network Protocol Sensor", hereby incorporated by reference. The PRETASK module disclosed in that application remains resident after completing its pre-scanning operation. Therefore, PRETASK need only be modified to perform the configurator function described with respect to FIG. 14.

In addition, the present invention can be used with the Network Expansion Device disclosed in U.S. patent application Ser. No. 08/489,283, filed on Jun. 9, 1995, and entitled "Network Device Which Responds To Status Changes Of Its Installed Peripheral By Generating A Testpage". The PRESCAN software module disclosed in that application would require modification-like the above-mentioned PRESCAN module. Further, that device has no NVRAM. Accordingly, both the software modules and configuration information must be stored in EPROM.

While the present invention has been described with respect to a particular illustrative embodiment, it is to be understood that the invention is not limited to the above described embodiment and that various changes and modifications may be made by those of ordinary skill in the art without departing from the spirit and scope of the invention.

What is claimed is:

1. A method for dynamically determining a media type of a local area network (LAN) to which a network device is connected, said method comprising the steps of:

executing at least one network interface driver software module, the network interface driver software module supporting a predefined network media type, wherein the network interface driver software module is the lowest level of software to communicate with the LAN and handles the sending and receiving of communication packets to and from the LAN by appending or stripping off packet frame headers, wherein the network interface driver software module has one or more logical boards for processing communication packets having different respective frame types and has one or more configuration tables, each respectively associated with one of the logical boards, which each include a frame type identifying value that identifies a combination of frame type and media type for packets processed by the corresponding logical board, and wherein the network interface driver software module has a service routine accessible via an entry point;

executing a multiplexer software module which interfaces between the network interface driver software module and one or more protocol stack modules, and which routes packets from the network interface driver software module to respective protocol stack modules according to the protocol used by the packets; and executing the one or more protocol stack modules for processing packets that use different respective protocols, wherein a protocol stack module:

obtains the entry point of the network interface driver service routine via the multiplexer software module;

obtains a location for one of the configuration tables via the service routine;

reads the frame type identifying value in the one configuration table; and determines the network media type from the network interface driver software module by comparing the frame type identifying value read from the one configuration table to one or more values that correspond to a predetermined media type.

2. A method according to claim 1, wherein the network interface driver software module has an 802.3 logical board that processes packets having an 802.3 frame type and the corresponding configuration table has an identifying value of 5 for an Ethernet media type and an identifying value of 4 for a token ring media type, and wherein a protocol stack determines the media type by reading the identifying value from the configuration table for the 802.3 logical board and comparing the identifying value that is read to the value 5.

3. A method according to claim 1, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to an Ethernet media type.

4. A method according to claim 1, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to a token ring media type.

5. A network interface device which interfaces with a local area network (LAN) and which dynamically determines a media type of the LAN to which the network device is interfaced, said network interface device comprising:

a storage device that stores (i) at least one network interface driver software module, the network interface driver software module supporting a predefined network media type, wherein the network interface driver software module is the lowest level of software to communicate with the LAN and handles sending and receiving of communication packets to and from the LAN by appending or stripping off packet frame headers, wherein the network interface driver software module has one or more logical boards for processing communication packets having different respective frame types, and wherein the network interface driver software module has a configuration table for each of the one or more logical boards and each configuration table includes a frame type identifying value that identifies a combination of frame type and media type for packets processed by the corresponding logical board, (ii) one or more protocol stack modules for processing packets that use different respective protocols, and (iii) a multiplexer software module which interfaces between the network interface driver software module and the one or more protocol stack modules and which routes packets from the network interface driver software module to respective protocol stack modules according to the protocol used by the packets; and a processor that executes the network interface driver software module, the multiplexer software module, and the one or more protocol stack modules, wherein upon execution, a protocol stack module reads the frame type identifying value in one of the configuration tables, and determines the network media type from the network interface driver software module by comparing the frame type identifying value read from the one configuration table to one or more values that correspond to a predetermined media type.

6. A network interface device according to claim 5, wherein the network interface driver software module has an 802.3 logical board that processes packets having an 802.3 frame type and the corresponding configuration table has an identifying value of 5 for an Ethernet media type and an identifying value of 4 for a token ring media type, and wherein said protocol stack determines the media type by reading the identifying value from the configuration table for the 802.3 logical board and comparing the identifying value that is read to the value 5.

7. A network interface device according to claim 5, wherein the arrangement of logical boards for different frame types in the network interface driver software module is unknown to said processor, and wherein said protocol stack determines the media type by reading the identifying value from the configuration table for one logical board and comparing the identifying value that is read to each possible value corresponding to an Ethernet media type.

8. A network interface device according to claim 5, wherein the arrangement of logical boards for different frame types in the network interface driver software module is unknown to said processor, and wherein said protocol stack determines the media type by reading the identifying value from the configuration table for one logical board and comparing the identifying value that is read to each possible value corresponding to a token ring media type.

9. Computer-executable process steps stored on a computer-readable medium, the computer executable process steps to dynamically determine a media type of a local area network (LAN) to which a network device is connected, said computer-executable process steps comprising:

code to execute at least one network interface driver software module, the network interface driver software module supporting a predefined network media type, wherein the network interface driver software module is the lowest level of software to communicate with the LAN and handles the sending and receiving of communication packets to and from the LAN by appending or stripping off packet frame headers, wherein the network interface driver software module has one or more logical boards for processing communication packets having different respective frame types and has one or more configuration tables, each respectively associated with one of the logical boards, which each include a frame type identifying value that identifies a combination of frame type and media type for packets processed by the corresponding logical board, and wherein the network interface driver software module has a service routine accessible via an entry point;

code to execute a multiplexer software module which interfaces between the network interface driver software module and one or more protocol stack modules, and which routes packets from the network interface driver software module to respective protocol stack modules according to the protocol used by the packets; and code to execute the one or more protocol stack modules for processing packets that use different respective protocols, wherein said protocol stack module includes:

code to obtain the entry point of the network interface driver service routine via the multiplexer software module;

code to obtain a location for one of the configuration tables via the service routine;

code to read the frame type identifying value in the one configuration table; and code to determine the network media type from the network interface driver software module by comparing the frame type identifying value read from the one configuration table to one or more values that correspond to a predetermined media type.

10. Computer-executable process steps according to claim 9, wherein the network interface driver software module has an 802.3 logical board that processes packets having an 802.3 frame type and the corresponding configuration table has an identifying value of 5 for an Ethernet media type and an identifying value of 4 for a token ring media type, and wherein a protocol stack determines the media type by reading the identifying value from the configuration table for the 802.3 logical board and comparing the identifying value that is read to the value 5.

11. Computer-executable process steps according to claim 9, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to an Ethernet media type.

12. Computer-executable process steps according to claim 9, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to a token ring media type.

13. A computer-readable medium which stores computer-executable process steps, the computer-executable process steps to dynamically determine a media type of a local area network (LAN) to which a network device is connected, the computer-executable process steps comprising:

a first executing step to execute at least one network interface driver software module, the network interface driver software module supporting a predefined network media type, wherein the network interface driver software module is the lowest level of software to communicate with the LAN and handles the sending and receiving of communication packets to and from the LAN by appending or stripping off packet frame headers, wherein the network interface driver software module has one or more logical boards for processing communication packets having different respective frame types and has one or more configuration tables, each respectively associated with one of the logical boards, which each include a frame type identifying value that identifies a combination of frame type and media type for packets processed by the corresponding logical board, and wherein the network interface driver software module has a service routine accessible via an entry point;

a second executing step to execute a multiplexer software module which interfaces between the network interface driver software module and one or more protocol stack modules, and which routes packets from the network interface driver software module to respective protocol stack modules according to the protocol used by the packets; and a third executing step to execute the one or more protocol stack modules for processing packets that use different respective protocols, wherein said protocol stack module:

obtains the entry point of the network interface driver service routine via the multiplexer software module;

obtains a location for one of the configuration tables via the service routine;

reads the frame type identifying value in the one configuration table; and determines the network media type from the network interface driver software module by comparing the frame type identifying value read from the one configuration table to one or more values that correspond to a predetermined media type.

14. A computer-readable medium according to claim 13, wherein the network interface driver software module has an 802.3 logical board that processes packets having an 802.3 frame type and the corresponding configuration table has an identifying value of 5 for an Ethernet media type and an identifying value of 4 for a token ring media type, and wherein a protocol stack determines the media type by reading the identifying value from the configuration table for the 802.3 logical board and comparing the identifying value that is read to the value 5.

15. A computer-readable medium according to claim 13, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to an Ethernet media type.

16. A computer-readable medium according to claim 13, wherein the arrangement of logical boards for different frame types in the network interface driver software module is unknown to the protocol stack modules, and wherein a protocol stack determines the media type by reading the identifying value from the configuration table for one logical board and comparing the identifying value that is read to each possible value corresponding to a token ring media type.

17. An information processing apparatus having a computer and a network interface device which interfaces to the computer via a network and which dynamically determines a media type of the network, wherein the network interface device comprises:

> a storage device that stores (i) at least one network interface driver software module, the network interface driver software module supporting a predefined network media type, wherein the network interface driver software module is the lowest level of software to communicate with the network and handles sending and receiving of communication packets to and from the network by appending or stripping off packet frame headers, wherein the network interface driver software module has one or more logical boards for processing communication packets having different respective frame types, and wherein the network interface driver software module has a configuration table for each of the one or more logical boards and each configuration table includes a frame type identifying value that identifies a combination of frame type and media type for packets processed by the corresponding logical board, (ii) one or more protocol stack modules for processing packets that use different respective protocols, and (iii) a multiplexer software module which interfaces between the network interface driver software module and the one or more protocol stack modules and which routes packets from the network interface driver software module to respective protocol stack modules according to the protocol used by the packets; and
>
> a processor that executes the network interface driver software module, the multiplexer software module, and the one or more protocol stack modules, wherein upon execution, a protocol stack module reads the frame type identifying value in one of the configuration tables, and determines the network media type from the network interface driver software module by comparing the frame type identifying value read from the one configuration table to one or more values that correspond to a predetermined media type.

18. A display system having a display apparatus and a network interface device which interfaces to the display apparatus via a network and which dynamically determines a media type of the network, wherein the network interface device comprises:

> a storage device that stores (i) at least one network interface driver software module, the network interface driver software module supporting a predefined network media type, wherein the network interface driver software module is the lowest level of software to communicate with the network and handles sending and receiving of communication packets to and from the network by appending or stripping off packet frame headers, wherein the network interface driver software module has one or more logical boards for processing communication packets having different respective frame types, and wherein the network interface driver software module has a configuration table for each of the one or more logical boards and each configuration table includes a frame type identifying value that identifies a combination of frame type and media type for packets processed by the corresponding logical board, (ii) one or more protocol stack modules for processing packets that use different respective protocols, and (iii) a multiplexer software module which interfaces between the network interface driver software module and the one or more protocol stack modules and which routes packets from the network interface driver software module to respective protocol stack modules according to the protocol used by the packets; and
>
> a processor that executes the network interface driver software module, the multiplexer software module, and the one or more protocol stack modules, wherein upon execution, a protocol stack module reads the frame type identifying value in one of the configuration tables, and determines the network media type from the network interface driver software module by comparing the frame type identifying value read from the one configuration table to one or more values that correspond to a predetermined media type.

19. A printing system having a printer and a network interface device which interfaces to the printer via a network and which dynamically determines a media type of the network, wherein the network interface device comprises:

> a storage device that stores (i) at least one network interface driver software module, the network interface driver software module supporting a predefined network media type, wherein the network interface driver software module is the lowest level of software to communicate with the network and handles sending and receiving of communication packets to and from the network by appending or stripping off packet frame headers, wherein the network interface driver software module has one or more logical boards for processing communication packets having different respective frame types, and wherein the network interface driver software module has a configuration table for each of the one or more logical boards and each configuration table includes a frame type identifying value that identifies a combination of frame type and media type for packets processed by the corresponding logical board, (ii) one or more protocol stack modules for processing packets that use different respective protocols, and (iii) a multiplexer software module which interfaces between the network interface driver software module and the one or more protocol stack modules and which routes packets from the network interface driver software module to respective protocol stack modules according to the protocol used by the packets; and
>
> a processor that executes the network interface driver software module, the multiplexer software module, and the one or more protocol stack modules, wherein upon execution, a protocol stack module reads the frame type identifying value in one of the configuration tables, and determines the network media type from the network interface driver software module by comparing the frame type identifying value read from the one configuration table to one or more values that correspond to a predetermined media type.

* * * * *